US012664795B2

(12) United States Patent
Ferroni

(10) Patent No.: US 12,664,795 B2
(45) Date of Patent: Jun. 23, 2026

(54) SYSTEM, METHOD, AND COMPUTER PROGRAM PRODUCT FOR STREAMING DATA MINING WITH TEXT-IMAGE JOINT EMBEDDINGS

(71) Applicant: Volkswagen Group of America Investments, LLC, Reston, VA (US)

(72) Inventor: Francesco Ferroni, Munich (DE)

(73) Assignee: Volkswagen Group of America Investments, LLC, Reston, VA (US)

( * ) Notice: Subject to any disclaimer, the term of this patent is extended or adjusted under 35 U.S.C. 154(b) by 603 days.

(21) Appl. No.: 18/161,287

(22) Filed: Jan. 30, 2023

(65) Prior Publication Data

US 2024/0257536 A1 Aug. 1, 2024

(51) Int. Cl.
*G06V 20/70* (2022.01)
*G06V 20/56* (2022.01)

(52) U.S. Cl.
CPC ............ *G06V 20/588* (2022.01); *G06V 20/70* (2022.01)

(58) Field of Classification Search
CPC ...... G06V 20/588; G06V 20/70; G06V 20/56; G06V 10/759; G06V 10/771
See application file for complete search history.

(56) References Cited

U.S. PATENT DOCUMENTS

| | | | |
|---|---|---|---|
| 9,110,922 B2 | 8/2015 | Bengio et al. | |
| 10,402,703 B2 | 9/2019 | Stoop et al. | |
| 11,438,377 B1 * | 9/2022 | Azarafrooz | G06N 3/08 |
| 2017/0061250 A1 * | 3/2017 | Gao | G06V 20/70 |
| 2017/0206465 A1 * | 7/2017 | Jin | G06F 16/5866 |
| 2018/0285700 A1 * | 10/2018 | Stoop | G06F 18/2415 |
| 2022/0035856 A1 * | 2/2022 | Gilder | G06F 16/5854 |

OTHER PUBLICATIONS

Segal S, Kee E, Luo W, Sadat A, Yumer E, Urtasun R. "Universal Embeddings for Spatio-Temporal Tagging of Self-Driving Logs." Proceedings of Conference on Robot Learning (CoRL). Nov. 16-18, 2020. Cambridge, MA, USA, pp. 973-983. https://doi.org/10.48550/arXiv.2011.06165. (Year: 2020).*

Radford et al., "Learning Transferable Visual Models From Natural Language Supervision", Feb. 26, 2021, p. 1-48.

Zhu et al., "Image-text Dual Neural Network with Decision Strategy for Small-sample Image Classification", CCF Chinese conference on Computer Vision, 2017, p. 1-20.

* cited by examiner

*Primary Examiner* — Vincent Rudolph
*Assistant Examiner* — Keely Gwynne Yeargin
(74) *Attorney, Agent, or Firm* — The Webb Law Firm

(57) ABSTRACT

Provided are systems, methods, and computer program products for streaming data mining with text-image joint embeddings by obtaining a roadway dataset, having a condition that each record in the roadway dataset includes an image logged by an autonomous vehicle (AV) in a roadway, generating based on a text-image model, an embedding dataset comprising an image embedding for each record in the roadway dataset, each image embedding identifying a point in a high dimension space, determining, by the one or more processors, a parametric description of a high probability field which surrounds a query input text in the high dimension space, determining, by the one or more processors, at least one input image of an input stream of images that is in the high probability field, and automatically labeling, by the one or more processors, the at least one input image based on the query input text.

16 Claims, 6 Drawing Sheets

300

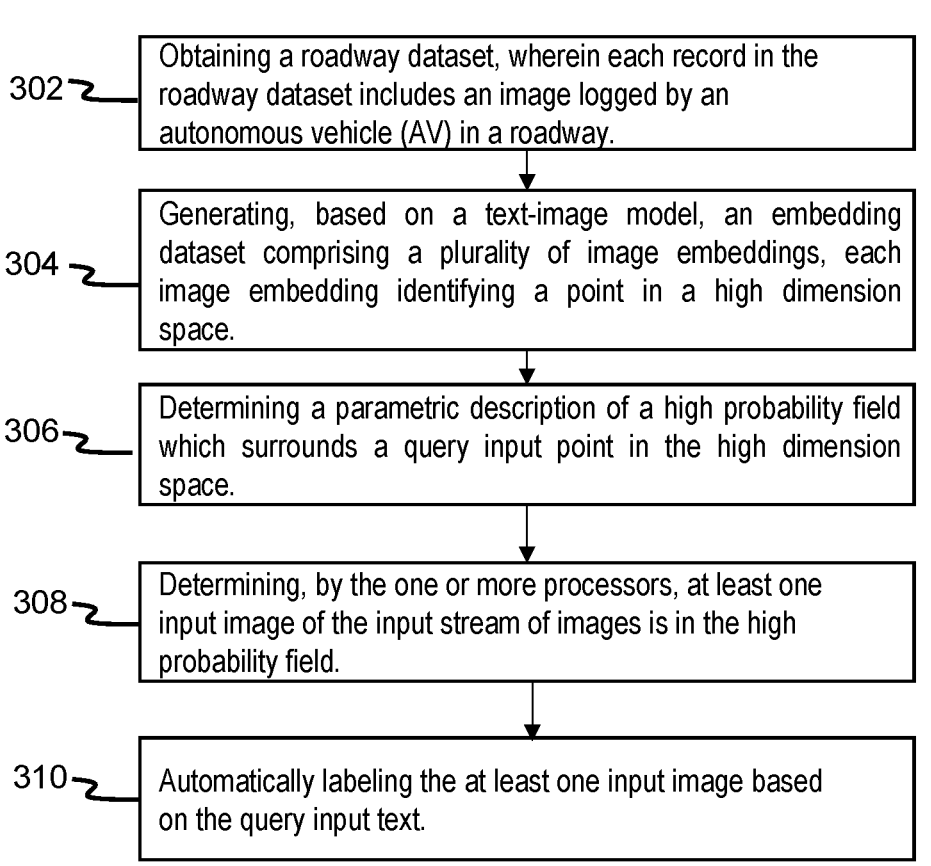

302 — Obtaining a roadway dataset, wherein each record in the roadway dataset includes an image logged by an autonomous vehicle (AV) in a roadway.

304 — Generating, based on a text-image model, an embedding dataset comprising a plurality of image embeddings, each image embedding identifying a point in a high dimension space.

306 — Determining a parametric description of a high probability field which surrounds a query input point in the high dimension space.

308 — Determining, by the one or more processors, at least one input image of the input stream of images is in the high probability field.

310 — Automatically labeling the at least one input image based on the query input text.

FIG. 3

SYSTEM, METHOD, AND COMPUTER PROGRAM PRODUCT FOR STREAMING DATA MINING WITH TEXT-IMAGE JOINT EMBEDDINGS

FIELD

This disclosure relates generally to streaming data mining with text-image joint embeddings including for use in a system for automatically identifying relevant samples in a streaming data set, automatically labeling samples identified, and automatically labeling images collected by an autonomous vehicle (AV), residing either onboard or off board, such as camera images, radar images, light detection and ranging (LiDAR) images, other streaming information detected or collected in the roadway, as well as automatically searching unlabeled images or sensor data based on input, such as a text query.

BACKGROUND

An autonomous vehicle (AV) is required to find an optimal route from the AV's current location to a specified destination (e.g., a goal, a specific location, a position, etc.) in a geographic area of a road network. To travel autonomously, an AV requires autonomy software, sensors, and diagnostics to form and successfully traverse a route to a destination or goal. When an AV equipped with autonomy software is in autonomous mode, the AV, or the self-driving system of the AV will have full responsibility for the task of driving while meeting the standards for an automated driving system.

Each AV in a large fleet of autonomous vehicles may use autonomy software in order to control AV operations, this activity involves significant collection of onboard data, including logging of raw images and high quality images (i.e., high efficiency video coding (HEVC), H. 265, advanced video coding, etc.) while traversing a roadway, which when combined, may produce terabytes of onboard data associated with operations of the fleet collected while navigating in the roadway. Even when only very specific events are logged, the amount of onboard data collected can still be difficult to work with, to sort, to search, and to label. Thus, systems may continue to gather large pools of onboard data that may never be labeled or may be difficult and intensive to label using existing techniques because of their size.

To improve the autonomy models (e.g. detection, perception, prediction, etc.) or develop new autonomy features, new data must be identified from cameras or sensors (e.g., LiDAR, radar, etc.). For example, large amounts of images are collected that require labeling so that the labeled images (and/or labels for the images) may be used later for training the autonomy systems for autonomous vehicles. In addition, new labels may be needed as new processing needs surface which require access to relevant data for new and additional features and combinations.

However, the significant amounts of onboard data requires extensive review and processing to properly label onboard data. The amount of time and resources for label review and comparison of onboard data (e.g., raw images, high quality images, etc.) may also restrain such labeling. Most importantly, given the significant amounts of unlabeled data to determine roadway features, the significant amounts of ongoing collection of data, and the significant improvements in autonomous sensor data, techniques are needed to more accurately, efficiently, and expeditiously search, and identify image data.

SUMMARY

Accordingly, disclosed are improved computer-implemented systems, methods, and computer program products for streaming data mining with text-image joint embeddings.

According to non-limiting embodiments or aspects, provided is a computer-implemented method for mining streaming data, comprising obtaining, by one or more processors, a roadway dataset comprising a plurality of records, wherein each record in the roadway dataset includes an image logged by an autonomous vehicle (AV) in a roadway; generating, by the one or more processors based on a text-image model, an embedding dataset comprising an image embedding for each record in the roadway dataset, each image embedding identifying a point in a high dimension space; determining, by the one or more processors, a parametric description of a high probability field which surrounds a query input text in the high dimension space; determining, by the one or more processors, at least one input image of an input stream of images that is in the high probability field; and automatically labeling, by the one or more processors, the at least one input image based on the query input text.

According to non-limiting embodiments or aspects, provided is a system for mining streaming data, comprising: a memory; and at least one processor coupled to the memory and configured to obtain a roadway dataset, wherein each record in the roadway dataset includes an image logged by an autonomous vehicle (AV) in a roadway; generate, based on a text-image model, an embedding dataset comprising an image embedding for each record in the roadway dataset, each image embedding identifying a point in a high dimension space; determine a parametric description of a high probability field which surrounds a query input text in the high dimension space; determine at least one input image of an input stream of images that is in the high probability field; and automatically label the at least one input image based on the query input text.

According to non-limiting embodiments or aspects, provided is a non-transitory computer-readable medium for mining streaming data, wherein the instructions stored thereon cause the at least one computing device to: encode an image to provide the image embedding for a corresponding image logged by the AV in the roadway dataset, wherein the image embedding represents an image embedding point in the high dimension space; and match an embedding of each input image in the input stream of images, with the parametric description of the high probability field to determine that each input image in the input stream of images is in the high probability field, wherein the parametric description for the high probability field which surrounds a query input point associated with a query input text, and wherein it is probable based on parameters in each image embedding of the embedding dataset that each input image fitting the parametric description of the high probability field is positioned in the high probability field of the query input point.

Non-limiting embodiments or aspects are set forth in the following numbered clauses:

Clause 1: A computer-implemented method for mining streaming data, comprising: obtaining, by one or more processors, a roadway dataset comprising a plurality of records, wherein each record in the roadway dataset includes an image logged by an autonomous vehicle (AV) in a roadway; generating, by the one or more processors based on a text-image model, an embedding dataset comprising an image embedding for each record in the roadway dataset, each image embedding identifying a point in a high dimension space; determining, by the one or more processors, a parametric description of a high probability field which surrounds a query input text in the high dimension space; determining, by the one or more processors, at least one input image of an input stream of images that is in the high probability field; and automatically labeling, by the one or more processors, the at least one input image based on the query input text.

Clause 2: The method of clause 1, further comprising: encoding an image to provide the image embedding for a corresponding image logged by the AV in the roadway dataset, wherein the image embedding represents an image embedding point in the high dimension space; and matching an embedding of each input image in the input stream of images, with the parametric description of the high probability field to determine that each input image in the input stream of images is in the high probability field, wherein the parametric description for the high probability field which surrounds a query input point associated with a query input text, and wherein it is probable based on parameters in each image embedding of the embedding dataset that each input image fitting the parametric description of the high probability field is positioned in the high probability field of the query input point.

Clause 3: The method of clauses 1-2, wherein determining in the high dimension space the parametric description of the high probability field, further comprises: receiving a query input text; generating a text query embedding to identify a query input point by encoding the query input text; determining a distance between the query input point and each image embedding of the embedding dataset; and generating a normal distribution.

Clause 4: The method of clauses 1-3, further comprising: determining to not label a second image of the input stream of images in response to determining that the second image of the input stream of images is not in the high probability field, wherein each input image in the input stream of images that resembles the query input text comprises a point in the high dimension space at a position within a threshold distance of a point in the high probability field representing the query input text, and wherein each input image in the input stream of images that does not resemble the query input text comprises a point in the high dimension space at a position outside the threshold distance of the point in the high probability field representing the query input text that is outside the threshold distance.

Clause 5: The method of clauses 1-4, wherein the input query text comprises a textual description and a probability parameter, wherein the input query text is received from a remote computing device or a remote application, wherein the input stream of images is obtained or detected by the AV, and wherein the embedding of the input image in the input stream of images is compared by the AV to the parametric description of the high probability field to determine if the image is in the high probability field.

Clause 6: The method of clauses 1-5, wherein the high probability field comprises at least one of a spread, a top percentage of probable records, or a range representing an area of the high probability field.

Clause 7: The method of clauses 1-6, wherein each record in the embedding dataset includes at least one image embedding and a link to a specific image which visualizes the image embedding.

Clause 8: The method of clauses 1-7, further comprising: slicing at least one image of the roadway dataset into a plurality of image slices; and encoding each of the plurality of image slices, wherein each of the plurality of image slices includes a metadata label.

Clause 9: The method of clauses 1-8, wherein a content of an input image of the input stream of images is determined without comparing pixel values by comparing an embedding of the image in the input stream with at least one image embedding in the roadway dataset.

Clause 10: A system, comprising: a memory; and at least one processor coupled to the memory and configured to: obtain a roadway dataset, wherein each record in the roadway dataset includes an image logged by an autonomous vehicle (AV) in a roadway; generate, based on a text-image model, an embedding dataset comprising an image embedding for each record in the roadway dataset, each image embedding identifying a point in a high dimension space; determine a parametric description of a high probability field which surrounds a query input text in the high dimension space; determine at least one input image of an input stream of images that is in the high probability field; and automatically label the at least one input image based on the query input text.

Clause 11: The system of clause 10, wherein the at least one processor coupled to the memory is further configured to: encode an image to provide the image embedding for a corresponding image logged by the AV in the roadway dataset, wherein the image embedding represents an image embedding point in the high dimension space; and match an embedding of each input image in the input stream of images, with the parametric description of the high probability field to determine that each input image in the input stream of images is in the high probability field, wherein the parametric description for the high probability field which surrounds a query input point associated with a query input text, and wherein it is probable based on parameters in each image embedding of the embedding dataset that each input image fitting the parametric description of the high probability field is positioned in the high probability field of the query input point.

Clause 12: The system of clauses 10-11, wherein determining in the high dimension space the parametric description of the high probability field, further comprises: receiving a query input text; generating a text query embedding to identify a query input point by encoding the query input text; determining a distance between the query input point and each image embedding of the embedding dataset; and generating a normal distribution.

Clause 13: The system of clauses 10-12, wherein the at least one processor coupled to the memory is further configured to: determine to not label a second image of the input stream of images in response to determining that the second image of the input stream of images is not in the high probability field, wherein each input image in the input stream of images that resembles the query input text comprises a point in the high dimension space at a position within a threshold distance of a point in the high probability field representing the query input text, and wherein each input image in the input stream of images that does not resemble the query input text comprises a point in the high dimension space at a position outside the threshold distance of the point in the high probability field representing the query input text that is outside the threshold distance.

Clause 14: The system of clauses 10-13, wherein the input query text comprises a textual description and a probability parameter, wherein the input query text is received from a remote computing device or a remote application, wherein the input stream of images is obtained or detected by the AV, and wherein the embedding of the input image in the input stream of images is compared by the AV to the parametric description of the high probability field to determine if the image is in the high probability field.

Clause 15: The system of clauses 10-14, wherein the high probability field comprises at least one of a spread, a top percentage of probable records, or a range representing an area of the high probability field.

Clause 16: The system of clauses 10-15, wherein each record in the embedding dataset includes at least one image embedding and a link to a specific image which visualizes the image embedding.

Clause 17: The system of clauses 10-16, wherein the at least one processor coupled to the memory is further configured to: slice at least one image of the roadway dataset into a plurality of image slices; and encode each of the plurality of image slices, wherein each of the plurality of image slices includes a metadata label.

Clause 18: The system of clauses 10-17, wherein a content of an input image of the input stream of images is determined without comparing pixel values by comparing an embedding of the image in the input stream with at least one image embedding in the roadway dataset.

Clause 19: A non-transitory computer-readable medium having instructions stored thereon that, when executed by at least one computing device comprising one or more processors, cause the at least one computing device to: obtain a roadway dataset, wherein each record in the roadway dataset includes an image logged by an autonomous vehicle (AV) in a roadway; generate, based on a text-image model, an embedding dataset comprising an image embedding for each record in the roadway dataset, each image embedding identifying a point in a high dimension space; determine a parametric description of a high probability field which surrounds a query input text in the high dimension space; determine at least one input image of an input stream of images that is in the high probability field; and automatically label the at least one input image based on the query input text.

Clause 20: The non-transitory computer-readable medium of clause 19, wherein the instructions stored thereon cause the at least one computing device to: encode an image to provide the image embedding for a corresponding image logged by the AV in the roadway dataset, wherein the image embedding represents an image embedding point in the high dimension space; and match an embedding of each input image in the input stream of images, with the parametric description of the high probability field to determine that each input image in the input stream of images is in the high probability field, wherein the parametric description for the high probability field which surrounds a query input point associated with a query input text, and wherein it is probable based on parameters in each image embedding of the embedding dataset that each input image fitting the parametric description of the high probability field is positioned in the high probability field of the query input point.

These and other features and characteristics of the present disclosure, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

The drawings are incorporated herein and form a part of the accompanying specification.

FIG. 3 is a flowchart of a non-limiting embodiment or aspect of a method for streaming data mining with text-image joint embeddings;

FIG. 7 provides non-limiting embodiments or aspects of a computer system in which systems, apparatuses, and/or methods, as described herein, may be implemented.

In the drawings, like reference numbers generally indicate identical or similar elements. Additionally, generally, the left-most digit(s) of a reference number identifies the drawing in which the reference number first appears.

DETAILED DESCRIPTION

Figure 1:
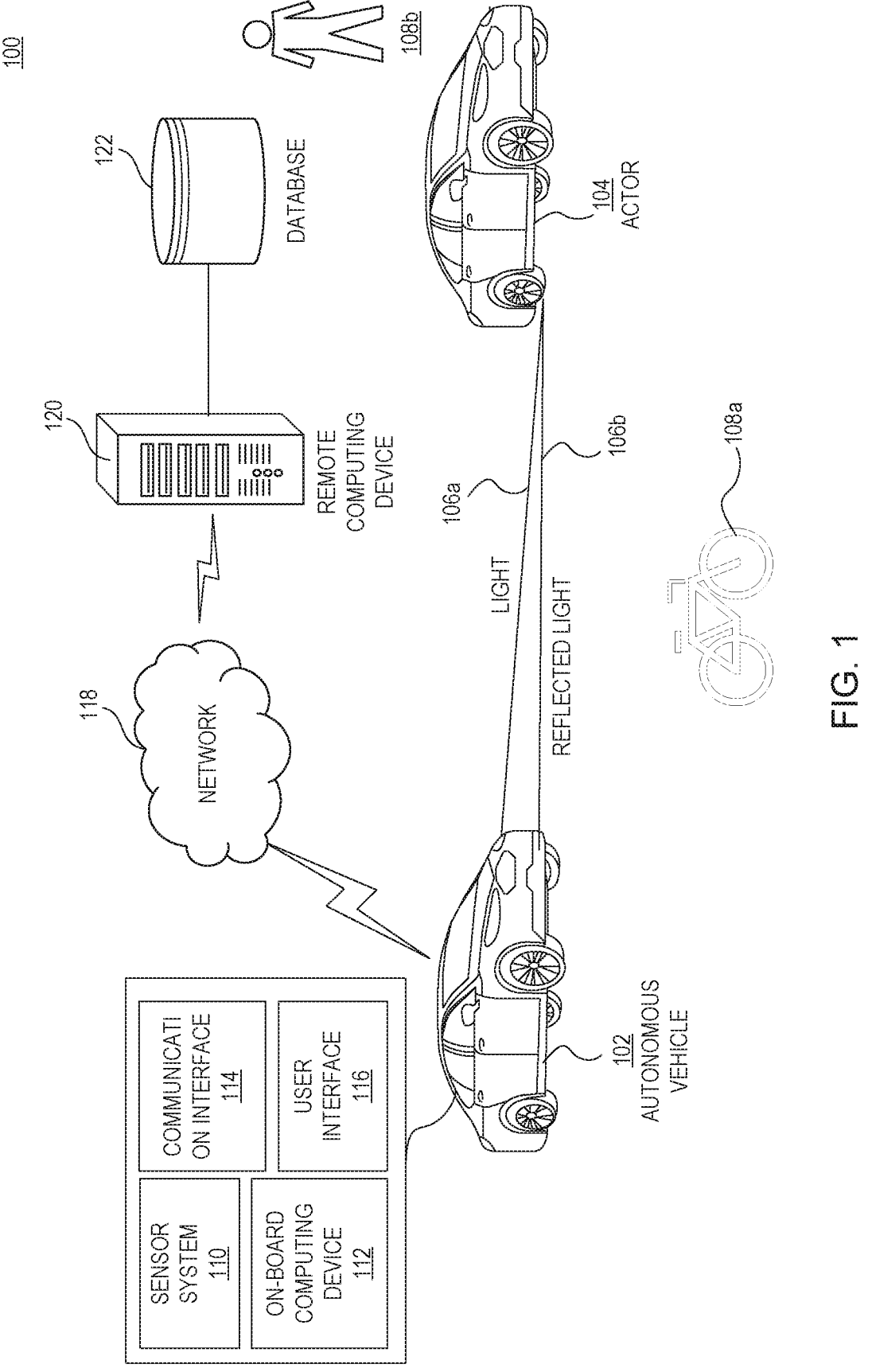
FIG. 1 is a diagram of non-limiting embodiments or aspects of an exemplary autonomous vehicle system, in accordance with aspects of the present disclosure.

According to some non-limiting embodiments or aspects, an onboard or off board system of an AV mines onboard image data (e.g., camera data, video data, sensor data, radar data, LiDAR data, etc.) with text-image joint embeddings. An AV may log multiple types of onboard image data from multiple sources (e.g., LiDAR, radar, camera images, video streams from cameras, etc.) by collecting onboard data in data streams as the AV traverses the roadway. Such data mining, accomplished by the AV, from a collection of onboard image data, by precision searching (e.g., mining, discovering, etc.) of visual images for AV subject matter to label. The AV subject matter identified may then be used to refine algorithms which can detect, recognize, or predict other objects on a street, a road edge, an entrance of a street, or in a correct lane to avoid other objects in the roadway. For example, unsupervised machine learning algorithms require labeled images for such tasks as object detection, creation of bounding boxes around images, lane recognition, and/or the like.

In examples where a target aspect may be pre-defined, such target aspects may not be already known by a model. For example, in some geographic locations, many commuters use bicycles. However, in other locations, there may be few or no bicycles used during commute. Thus, if bicycles are not in a data set, such as, for example, a data set from the second-mentioned location, then it would be impossible to find the data and also difficult to know if it contained bicycles other than looking at each image. Thus, the data set could not be used to detect bicycles in locations where bicycles are present, as the model itself would not have bicycles as part of its lexicon.

However, in existing systems, an AV may not be able to collect and label images present in the roadway of the AV. Instead, in existing systems, an AV collects images and sends them to a central repository, where they may or may not be reviewed, and may not be sufficiently reviewed to identify subject matter of an image.

In addition, existing AV systems may be incapable of or insufficient to provide a textual search of unlabeled on-board image data, may be incapable or insufficient to search each record of a dataset comprising unlabeled on-board image data, and may be incapable or insufficient to provide searching other than constrained and limited searching by visually comparing two unlabeled images through manual intervention. In addition, a searcher may want to send to a labelling system, images that contain "dogs" from a data stream, but may not be able to manually identify large amounts of images with dogs efficiently from on-board image data because no dog detector is available, and therefore the user cannot identify dog images. Furthermore, the data stream may be too large to feasibly store or persist in its entirety.

Existing systems rely on closed-world detectors which detect a limited, pre-defined ontology. Existing systems may also form or have no awareness of natural language. Accordingly, existing systems may also be cumbersome to update with heuristics and rules associated to selecting streamed data for further processing. Often, this is exactly the use-case: to look for data that is from a new unseen or ill-defined category.

In addition, existing systems may not be capable of labeling image data in a stream of on-board image data. Existing systems may also be incapable of identifying subject matter of on-board image data for continuously labeling a stream of on-board image data over an extended period of time. For example, storage constraints may prevent, limit, or otherwise be insufficient in existing systems, and may be unable to identify (e.g., find, match, etc.) images in large data streams in a limited, or predetermined time period. Moreover, bootstrapping a specialized dog detector from a random selection of data may be infeasible given a time constraint for labeling, and may inaccurately determine a specialized detection algorithm, be unable to deploy a specialized detection algorithm, or obtain insufficient information for writing heuristics that select images from a stream of on-board image data for a new dog detector model. In this case, a development cycle requires long iterative periods of development and testing that may span multiple development teams (detection, infrastructure, labelling) and various areas of expertise (deep learning, labelling operations and tooling, cloud/onboard, etc.).

The present disclosure describes systems and methods that can improve, address, and overcome such limitations and difficulties that exist in the existing systems described above. For example, the present disclosure describes an efficient and accurate iteration cycle. By way of example, a text query such as "a picture of a dog" is provided, and a likelihood threshold is determined for each image from on-board image data. Since the underlying model and deployment process may not change, queries and data-mining requirements may be efficiently updated, either in an on-board processing system or a cloud-native stream processing system.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated. In addition, terms of relative position, such as, "vertical" and "horizontal", "ahead" and "behind", or "front" and "rear", when used, are intended to be relative to each other and need not be absolute, and only refer to one possible position of the device associated with those terms depending on the device's orientation.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Additionally, when terms, such as, "first" and "second" are used to modify a noun, such use is simply intended to distinguish one item from another, and is not intended to require a sequential order unless specifically stated.

In some non-limiting embodiments or aspects, one or more aspects may be described herein, in connection with thresholds (e.g., a tolerance, a tolerance threshold, etc.). As used herein, satisfying a threshold may refer to a value (e.g., a score, an objective score, etc.) being greater than the threshold, more than the threshold, higher than the threshold, greater than or equal to the threshold, less than the threshold, fewer than the threshold, lower than the threshold, less than or equal to the threshold, equal to the threshold, etc.

As used herein, the terms "communication" and "communicate" may refer to the reception, receipt, transmission, transfer, provision, and/or the like of information (e.g., data, signals, messages, instructions, commands, and/or the like). For one component (e.g., a unit, a device, a system, an element, or a component, of a device or system, combinations thereof, and/or the like) to be in communication with another component means that the one component is able to directly or indirectly receive information from and/or send (e.g., transmit) information to the other component. This may refer to a direct or indirect connection that is wired and/or wireless in nature. Additionally, two components may be in communication with each other even though the information transmitted may be modified, processed, relayed, and/or routed between the first and second component. For example, a first component may be in communication with a second component even though the first component passively receives information and does not actively send information to the second component. As another example, a first component may be in communication with a second component if at least one intermediary component (e.g., a third component located between the first component and the second component) processes information received from the first component and sends the processed information to the second component. In some non-limiting embodiments or aspects, a message may refer to a network packet (e.g., a data packet and/or the like) that includes data.

As used herein, the term "computing device", "electronic device", or "computer" may refer to one or more electronic devices configured to process data. A computing device may in some examples, include the necessary components to receive, process, and output data, such as, a processor, a display, a memory, an input device, a network interface, and/or the like. A computing device may be included in a device on-board an (AV). As an example, a computing device may include an on-board specialized computer (e.g., a sensor, a controller, a data store, a communication interface, a display interface, etc.), a mobile device (e.g., a smartphone, standard cellular phone, or integrated cellular device,), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client", "client device", and "remote device" may refer to one or more computing devices that access a service made available by a server. In some non-limiting embodiments or aspects, a "client device" may refer to one or more devices that facilitate a maneuver by an AV, such as, one or more remote devices communicating with an AV. In some non-limiting embodiments or aspects, a client device may include a computing device configured to communicate with one or more networks and/or facilitate vehicle movement, such as, but not limited to, one or more vehicle computers, one or more mobile devices, and/or other like devices.

As used herein, the term "server" may refer to or include one or more computing devices that are operated by or facilitate communication and processing for multiple parties in a network environment, such as, the Internet, although it will be appreciated that communication may be facilitated over one or more public or private network environments and that various other arrangements are possible. Further, multiple computing devices (e.g., servers, data stores, controllers, communication interfaces, mobile devices, and/or the like) directly or indirectly communicating in the network environment may constitute a "system." The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices, such as, but not limited to, processors, servers, client devices, sensors, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function. The terms "memory," "memory device," "data store," "data storage facility," and the like each refer to a non-transitory device on which computer-readable data, programming instructions, or both are stored. Except where specifically stated otherwise, the terms "memory," "memory device," "data store," "data storage facility," and the like are intended to include single device embodiments, embodiments in which multiple memory devices together or collectively store a set of data or instructions, as well as, individual sectors within such devices.

According to some non-limiting embodiments, the term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones, and the like. An AV is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The AV can be a ground-based AV (e.g., car, truck, bus, etc.), an air-based AV (e.g., airplane, drone, helicopter, or other aircraft), or other types of vehicles (e.g., watercraft).

As used herein, the terms "trajectory" and "trajectories" may refer to a path (e.g., a path through a geospatial area, etc.) with positions of the AV along the path with respect to time, where a "path" generally implies a lack of temporal information, such as one or more paths for navigating an AV in a roadway for controlling travel of the AV on the roadway. A trajectory may be associated with a map of a geographic area including the roadway. In such an example, the path may traverse a roadway, an intersection, another connection or link of the road with another road, a lane of the roadway, objects in proximity to and/or within the road, and/or the like. For example, a trajectory may define a path of travel on a roadway for an AV that follows each of the rules (e.g., the path of travel does not cross a yellow line, etc.) associated with the roadway. In such an example, an AV that travels over or follows the trajectory (e.g., that travels on the roadway without deviating from the trajectory, etc.) may obey each of the rules or account for constraints (e.g., objects in the roadway, does not cross the yellow line, etc.) associated with the roadway.

As used herein, "map data" and "sensor data" includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. According to some non-limiting embodiments, a map of a geographic location (or area) includes one or more routes (e.g., a nominal route, a driving route, etc.) that include one or more roadways. According to some non-limiting embodiments or aspects, map data (e.g., Google maps, Open Street Map (OSM), Tiger flies (e.g., geospatial data, map data, etc.) associated with a map of the geographic location associates the one or more roadways with an indication of whether an AV can travel on that roadway.

As used herein, "sensor data" includes data from one or more sensors. For example, sensor data may include light detection and ranging (LiDAR) point cloud maps (e.g., map point data, etc.) associated with a geographic location (e.g., a location in three-dimensional space relative to the LiDAR system of a mapping vehicle in one or more roadways) of a number of points (e.g., a point cloud) that correspond to objects that have reflected a ranging laser of one or more mapping vehicles at the geographic location (e.g. an object such as a vehicle, a bicycle, a pedestrian, etc. in the roadway). As an example, sensor data may include LiDAR point cloud data that represents objects in the roadway, such as, other vehicles, pedestrians, cones, debris, and/or the like.

As used herein, a "road" refers to a paved or an otherwise improved path (e.g., street, road segment, etc.) between two places that allows for travel by a vehicle (e.g., AV). Additionally or alternatively, a road includes a roadway and a sidewalk in proximity to (e.g., adjacent, near, next to, abutting, touching, etc.) the roadway. In some non-limiting embodiments or aspects, a roadway includes a portion of a road on which a vehicle is intended to travel and is not restricted by a physical barrier or by separation so that the vehicle is able to travel laterally. Additionally or alternatively, a roadway (e.g., a road network, one or more roadway segments, etc.) includes one or more lanes in which a vehicle may operate, such as, a travel lane (e.g., a lane upon which a vehicle travels, a traffic lane, etc.), a parking lane (e.g., a lane in which a vehicle parks), a turning lane (e.g., a lane in which a vehicle turns from), and/or the like. Additionally or alternatively, a roadway includes one or more lanes in which a pedestrian, bicycle, or other vehicle may travel, such as, a crosswalk, a bicycle lane (e.g., a lane in which a bicycle travels), a mass transit lane (e.g., a lane in which a bus may travel), and/or the like. According to some non-limiting embodiments, a roadway is connected to another roadway to form a road network, for example, a lane of a roadway is connected to another lane of the roadway and/or a lane of the roadway is connected to a lane of another roadway. In some non-limiting embodiments, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

As used herein, navigating (e.g., traversing, driving, etc.) a route may involve the creation of at least one trajectory or path through the road network and may include any number of maneuvers or an evaluation of any number of maneuvers (e.g., a simple maneuver, a complex maneuver, etc.), such as, a maneuver involving certain driving conditions, such as, dense traffic, where successfully completing a lane change may require a complex maneuver, like speeding up, slowing down, stopping, or abruptly turning, for example, to steer into an open space between vehicles, pedestrians, or other objects (as detailed herein) in a destination lane. Additionally, in-lane maneuvers may also involve an evaluation of any number of maneuvers, such as, a maneuver to traverse a lane split, an intersection (e.g., a three-leg, a four-leg, a multi-leg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns, etc.), merging lanes (e.g., two lanes merging to one lane, one lane ends and merges into a new lane to continue, etc.), and/or the like. Maneuvers may also be based on current traffic conditions that may involve an evaluation of any number of maneuvers, such as, a maneuver based on a current traffic speed of objects in the roadway, a current traffic direction (e.g., anti-routing traffic, wrong-way driving, or counter flow driving, where a vehicle is driving against the direction of traffic and/or against the legal flow of traffic), current accidents or other incidents in the roadway, weather conditions in the geographic area (e.g., rain, fog, hail, sleet, ice, snow, etc.), or road construction projects. In addition, maneuvers may also involve an evaluation of any number of objects in and around the roadway, such as, a maneuver to avoid an object in proximity to a road, such as, structures (e.g., a building, a rest stop, a toll booth, a bridge, etc.), traffic control objects (e.g., lane markings, traffic signs, traffic lights, lampposts, curbs of the road, gully, a pipeline, an aqueduct, a speedbump, a speed depression, etc.), a lane of a roadway (e.g., a parking lane, a turning lane, a bicycle lane, etc.), a crosswalk, a mass transit lane (e.g., a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

As used herein, machine learning means applications (e.g., deep learning, artificial intelligence, neural networks, etc.) of new models and advancements in computational power in practical applications of the technology. For example, machine learning applications are used herein to generate and provide mission critical roadway information. Additionally, machine learning applications are used herein to automate heretofore processes or actions (e.g., joint text-image embeddings, etc.) that may not have been efficiently automated, such as generating, streaming data mining to determine a label for an image, or alternatively, to find images matching or having similar aspect to a specified image or natural language text.

As used herein, the term "supervised learning" may refer to one or more machine learning algorithms that start with known input variables (x) and an output variable (y), and learn the mapping function from the input to the output. The goal of supervised learning is to approximate the mapping function so that predictions can be made about new input variables (x) that can be used to predict the output variables (y) for that data. The process of a supervised algorithm learning from the training dataset can be thought of as a teacher supervising the learning process. The correct answers are known. The algorithm iteratively makes predictions on the training data and is corrected by the teacher. Learning stops when the algorithm achieves an acceptable level of performance. Supervised learning problems can be further grouped into regression problems and classification problems. Supervised learning techniques can use labeled (e.g., classified) training data with normal and outlier data, but are not as reliable because of the lack of labeled outlier data. For example, multivariate probability distribution based systems are likely to score the data points with lower probabilities as outliers. A regression problem is when the output variable is a real value, such as "dollars" or "exceptions". A classification problem is when the output variable is a category, such as "red" and "blue," or "compliant" and "non-compliant".

As used herein, the term "unsupervised learning" may refer to an algorithm which has input variables (x) and no corresponding output variables. The goal for unsupervised learning is to model the underlying structure or distribution in the data in order to learn more about the data. Unlike supervised learning, in unsupervised learning there are no correct answers and there is no teacher. Unsupervised learning algorithms are used to discover and present the interesting structure in the data. Unsupervised learning problems can be further grouped into clustering and association problems. A clustering problem is modeling used to discover the inherent groupings in a dataset, such as grouping customers by purchasing behavior. An association rule learning problem is where you want to discover rules that describe large portions of data, such as suppliers that have a contract order exception also tend to have a voucher extended price that exceed a purchase order price. Some examples of unsupervised learning algorithms are clustering and likelihood modeling.

As used herein, the term "training" may refer to a process of analyzing training data to generate and/or optimize a model (e.g., a machine learning algorithm, a prediction model, a classification model, a segmentation model, etc.). For example, a training server uses machine learning techniques to analyze and learn directly from the training data (e.g., images, natural language, roadway data, etc.) to generate the model, often the training data includes numerous examples so that a robust model is generated to solve a problem for many variations present in the data. In some non-limiting embodiments or aspects, generating the model (e.g., based on training data from a variety of sources) is referred to as "training the model." The machine learning techniques include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, and/or the like. In some non-limiting embodiments or aspects, the model includes a prediction model that is specific to a particular geographic location, a particular object in a roadway, a particular motion in a roadway, a particular trajectory, and/or the like.

In some non-limiting embodiments or aspects, a machine learning inference engine (e.g., inference nodes, etc.) executes a model algorithm and returns an inference output. For example, an inference engine (e.g., a pre-trained inference server, etc.) may utilize one or more processing units (e.g., a central processing unit (CPU), general processing unit (GPU), tensor processing unit (TPU), field programmable gateway array (FPGA), an application-specific integrated circuit (ASIC), etc.) to make predictions, segmentations, classifications, determinations, and/or the like by executing the model algorithm.

The present disclosure provides an improved method, system, and computer program product for mining streaming data, such as by obtaining, by one or more processors, a roadway dataset, wherein each record in the roadway dataset includes an image logged by an autonomous vehicle in a roadway, generating, by the one or more processors based on a text-image model, an embedding dataset comprising an image embedding for each record in the roadway dataset, each image embedding identifying a point in a high dimension space, determining, a parametric description of a high probability field which surrounds a query input text in the high dimension space, determining, at least one input image of an input stream of images that is in the high probability field, and automatically labeling, the at least one input image based on the query input text.

In this way, in some non-limiting embodiments or aspects, an AV system is configured to provide streaming data mining with text-image joint embeddings that may efficiently and accurately identify relevant samples of data, transmitted, obtained, read, or received in a streaming fashion (either onboard or off-board) to be selected and further processed (e.g., logged, sent to labelling, etc.) given one or more queries that are provided via a textual input and/or image input. The system for streaming data mining properly determines which data from a large pool of collected data to select, identify, and label, thereby maximizing the efficiency of labeled data.

In some non-limiting embodiments or aspects, the system for streaming data mining generates text-image joint embeddings that may efficiently retrieve on-board image data including concepts that are not necessarily easily described by a word ontology (or if described in words, may be verbose), in a stream of on-board image data, based on a text query. As an example, a feasible query could come directly from an image prototype found on the web, or the same images and text descriptions that would be provided to a labelling operator.

In some non-limiting embodiments or aspects, the system for streaming data accurately links a selected, identified, or labeled image, such as a camera image that includes identified subject matter, by a row index to other on-board image data. By matching data streams, images of data streams, or images found in an image space, other linked data may be found, identified, or labeled. For example, a time stamp may accurately align data, such as a row of data with other rows in a data set so that the AV can learn or obtain information indicating a point in time where a sensor operation occurred in the past, for example, a LiDAR measurement, radar measurement, camera image taken, and/or the like.

Still further, the systems, methods, and computer program products described herein can also help to more accurately or efficiently label information by identifying a condition of the roadway, such as a time, a location, or other vehicle movements in the roadway, to more efficiently or accurately collect data for input.

In some non-limiting embodiments or aspects, an AV is configured for smarter labeling of images, based on narrow instructions to collect images only during specific events (e.g. driver takeover, random mining, fine class mining, etc.). In this way, only images that are relevant and useful for improving performance of algorithms can be labeled from collection. Such images may be important to find, since they may contribute to labeling.

In this way, images are introduced for training one or more machine learning algorithms by smart labeling of streaming on-board image data. Thereby obtaining, storing, and labeling images of interest, such that the system can label only images that are relevant and useful for improving performance of algorithms based on subject matter.

FIG. 1 provides one non-limiting embodiment of a system 100 in which devices, systems, and/or methods described herein, may be implemented. System 100 comprises autonomous vehicle 102 (e.g., AV 102, and referred to herein as one or more AVs 102 when more than one AV may perform an action) that is traveling along a road in a semi-autonomous or autonomous manner. AV 102 is also referred to herein as vehicle 102.

AV 102 is generally configured to detect objects in the roadway, such as actor 104, bicyclist 108a, and pedestrian 108b in proximity thereto. The objects can include, but are not limited to, a vehicle, such as actor 104, bicyclist 108a (e.g., a rider of a bicycle, an electric scooter, a motorcycle, or the like) and/or pedestrian 108b. Actor 104 may be an autonomous vehicle, semi-autonomous vehicle, or alternatively, a non-autonomous vehicle controlled by a driver.

As illustrated in FIG. 1, AV 102 may include sensor system 110, on-board computing device 112, communication interface 114, and user interface 116. AV 102 may further include certain components (as illustrated, for example, in FIG. 2) included in vehicles, which may be controlled by on-board computing device 112 using a variety of communication signals and/or commands, such as, for example, acceleration signals or commands, deceleration signals or commands, steering signals or commands, braking signals or commands, etc. For example, AV 102 may include a logger which is a hard drive programmed with software (e.g., received configuration information, etc.) provided from a trusted party indicating when and where AV 102 should collect information (e.g., images, sensor data, etc.).

AV 102 may communicate with remote computing device 120. For example, AV 102 may communicate onboard image data (e.g., Camera data, LiDAR data, radar data, etc.) to remote computing device 120 using a variety of communication signals and/or commands. As used herein, remote computing device 120 shall generally refer to one or more sub-components or machines configured for receiving, manipulating, configuring, analyzing, synthesizing, communicating, and/or processing data associated with AV 102, the AV's perception information, the AV's onboard image data, hardware information, and/or routing information. Any of the foregoing subcomponents or machines can optionally be integrated into a single operating unit, or distributed throughout multiple hardware entities through networked or cloud-based resources. Moreover, remote computing device 120 may be configured to interface with and/or receive any or all data to/from AV 102 and/or one or more components of system 100.

Figure 2:
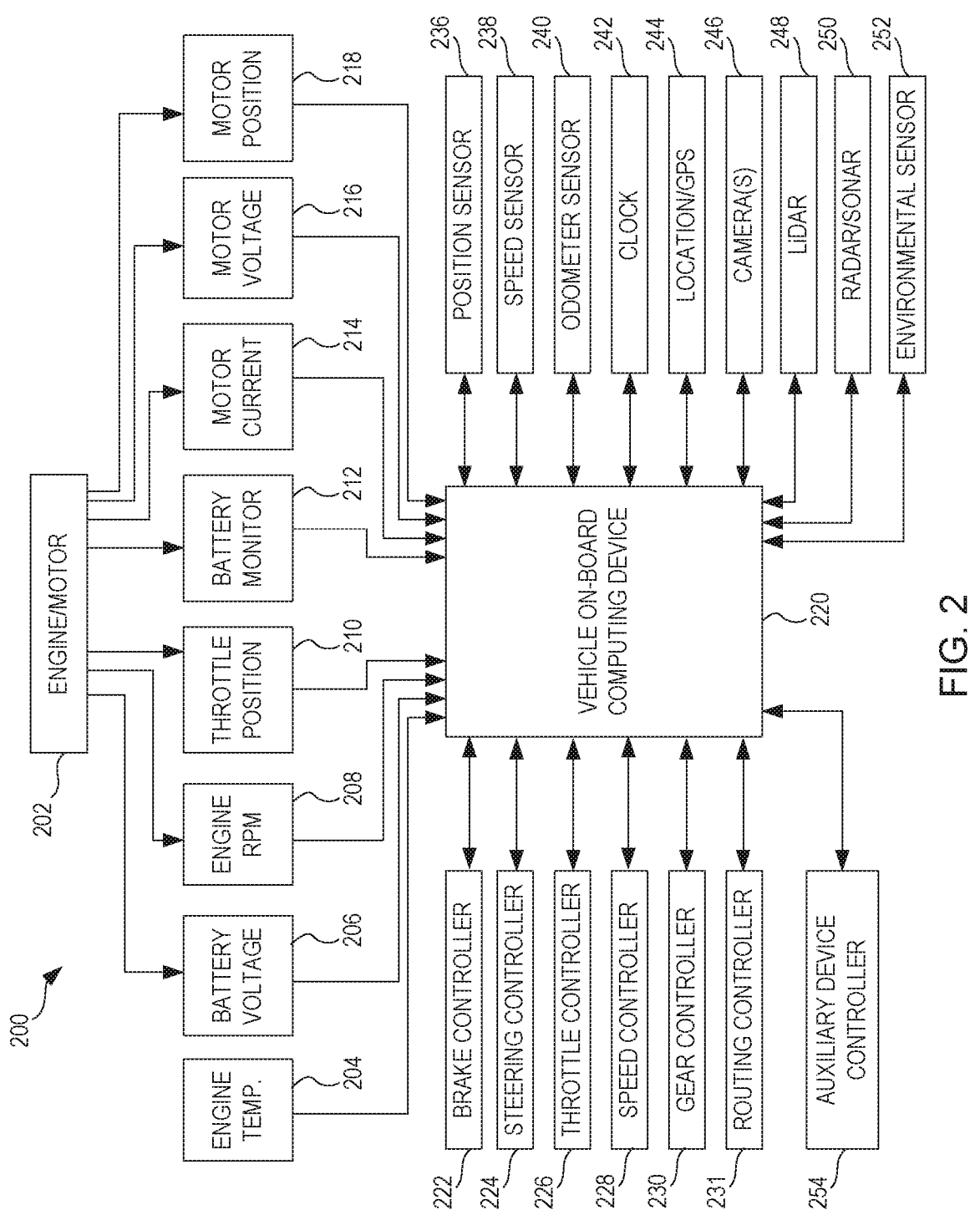
FIG. 2 is a diagram of non-limiting embodiments or aspects of an exemplary architecture for a vehicle in which streaming data mining with text-image joint embeddings, as described herein, may be implemented.

Sensor system 110 may include one or more sensors that are coupled to and/or are included within AV 102, as illustrated in FIG. 2. For example, such sensors may include, without limitation, a laser detection system, a radio detection and ranging (RADAR) system, a light detection and ranging (LiDAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, and/or the like. The sensor data can include information that describes the location of objects within the surrounding environment of AV 102, information about the environment itself, information about the motion of AV 102, information about a route of AV 102, and/or the like. As AV 102 moves over a surface, at least some of the sensors may collect data pertaining to the surface.

In some non-limiting embodiments or aspects, one or more processors of AV 102 can send a communication that includes sensor information identifying a location of objects within the surrounding environment of AV 102, information describing the environment itself, information about the motion of AV 102, information about a route of AV 102, information about a position of AV 102 (or other objects in the roadway) while traversing a route of AV 102 and/or the like. As AV 102 moves over a surface, at least some of the sensors may collect data pertaining to the roadway.

As will be described in greater detail, AV 102 may be configured with a LiDAR system (e.g., LiDAR 264 of FIG. 2.) The LiDAR system may be configured to transmit light pulse 106a to detect objects located within a distance or range of distances of AV 102. Light pulse 106a may be incident on one or more objects (e.g., actor 104, bicyclist 108a, pedestrian 108b) and be reflected back to the LiDAR system. Reflected light pulse 106b incident on the LiDAR system may be processed to determine a distance of that object to AV 102. Reflected light pulse 106b may be detected using, in some non-limiting embodiments, a photodetector or array of photodetectors positioned and configured to receive the light reflected back into the LiDAR system. LiDAR information, such as detected object data, is communicated from the LiDAR system to on-board computing device 112 (e.g., one or more processors of AV 102, vehicle on-board computing device 220 of FIG. 2, etc.).

AV 102 may also communicate on-board image data (e.g., Camera data, Radar data, LiDAR data, etc.) to remote computing device 120 (e.g., cloud processing system) over communications network 118. Remote computing device 120 may be configured with one or more servers to process one or more processes of the technology described herein. Remote computing device 120 may also be configured to communicate data/instructions to/from AV 102 over network 118, to/from server(s) and/or database(s) 122. For example, remote computing device 120 can communicate a trigger to one car or many cars simultaneously. In such an example, when AV 102 enters a roadway (e.g., road segment, lane segment, etc.) that is associated with a trigger, the trigger invokes the logger to save (e.g., collect, etc.) an image of the area as described below. In addition, the logger has a buffer, so there is a delay, and the buffer makes it possible to log information before and after the trigger. When the AV 102 is triggered, it identifies and stores a number of items, including time, location, what operations or actions the AV is performing, store data, store camera images, and/or the like. Instead of constantly logging information, AV 102 is very specific as to what is collected (e.g., logged, etc.).

In some non-limiting embodiments or aspects, systems for collecting on-board image data pertaining to the surface may be included in systems other than AV 102, such as, without limitation, other vehicles (autonomous or driven), mapping vehicles, robots, satellites, etc.

Network 118 may include one or more wired or wireless networks. For example, network 118 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or obtain track data, confidence level logic, optimizing data, association data, information, and/or the like, delivered via network 118 from database 122. Database 122 may be configured to store and supply raw data, indexed data, structured data, map data, program instructions, or other configurations as is known.

Communications interface 114 may be configured to allow communication between AV 102 and external systems, such as, for example, external devices, sensors, other vehicles, servers, data stores, databases, and/or the like. Communications interface 114 may utilize any now or hereafter known protocols, protection schemes, encodings, formats, packaging, etc. such as, without limitation, Wi-Fi, an infrared link, Bluetooth, etc. User interface 116 may be part of peripheral devices implemented within AV 102 including, for example, a keyboard, a touch screen display device, a microphone, and a speaker, etc.

In some non-limiting embodiments or aspects, embeddings for images in the archives may be pre-computed by AV 102 (e.g., on-board computing device 112) or remote computing device 120. These images need not be labelled with additional metadata, they can be raw images collected from many drives and/or cities and transferred to remote computing device 120 via communication interface 114. In some examples, such data is collected frequently as AV 102 navigates, such data can grow large very quickly making processing more time intensive. These embeddings can be stored in database 122, for example, database 122 is rapidly searchable for nearest neighbors, using, e.g., approximate KD-trees.

In some non-limiting embodiments or aspects, on-board computing device 112 determines an embedding (e.g., a hash, a continuous hash function, etc.), by hashing (e.g., embedding) an image of significant size (e.g., comprised of a million or more of pixels, etc.), each that have 256 possible numbers, creating billions of potential combinations with which to compact each image (e.g., down to a vector of 512 numbers). Database 122 may store each image with a link, such as an Amazon (e.g., AWS) link to a particular image file in a cloud that has a hash (i.e., 512 numbers) describing it.

Referring now to FIG. 2, FIG. 2 illustrates an exemplary system architecture 200 for a vehicle, in accordance with aspects of the disclosure. AV 102 (or vehicles 104) of FIG. 1 can have the same or similar system architecture as that shown in FIG. 2. Thus, the following discussion of system architecture 200 is sufficient for understanding vehicle(s) 102 and 104 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 of AV 102 includes an engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations per Minute (RPM) sensor 208, and throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and motor voltage 216 sensors, and motor position sensors 218 such as resolvers and encoders.

Operational parameter sensors that are common to both types of vehicles include, for example: position sensor 236 such as an accelerometer, gyroscope and/or inertial measurement unit; speed sensor 238; and odometer sensor 240. The vehicle also may have clock 242 that the system uses to determine vehicle time during operation. Clock 242 may be encoded into vehicle on-board computing device 220, it may be a separate device, or multiple clocks may be available.

The vehicle also includes various sensors that operate to gather information about the environment in which the vehicle is traveling. These sensors may include, for example: location sensor 260 (e.g., a Global Positioning System (GPS) device); object detection sensors such as one or more cameras 262; LiDAR 264; and/or a radar and/or sonar system 266. The sensors also may include environmental sensors 268 such as a precipitation sensor and/or ambient temperature sensor. The object detection sensors may enable the vehicle to detect objects that are within a given distance range of the vehicle (e.g., AV 102) in any direction, while the environmental sensors collect data about environmental conditions within the vehicle's area of travel.

During operations, information is communicated from the sensors to vehicle on-board computing device 220. Vehicle on-board computing device 220 is implemented using the computer system of FIG. 7. Vehicle on-board computing device 220 analyzes the data captured by the sensors and optionally controls operations of the vehicle based on results of the analysis. For example, vehicle on-board computing device 220 may control one or more of: braking via brake controller 222; direction via steering controller 224; speed and acceleration via throttle controller 226 (in a gas-powered vehicle) or motor speed controller 228 (such as a current level controller in an electric vehicle); differential gear controller 230 (in vehicles with transmissions); other controllers, and/or the like. Auxiliary device controller 254 may be configured to control one or more auxiliary devices, such as testing systems, auxiliary sensors, mobile devices transported by the vehicle, and/or the like.

Geographic location information may be communicated from location sensor 260 to vehicle on-board computing device 220, which may then access a map of the environment that corresponds to the location information to determine known fixed features of the environment such as streets, buildings, stop signs, and/or stop/go signals. Captured images from cameras 262 and/or object detection information captured from sensors such as LiDAR 264 is communicated from those sensors to vehicle on-board computing device 220. The object detection information and/or captured images are processed by vehicle on-board computing device 220 to detect objects in proximity to vehicle 102 (or AV 102). Any known or to be known technique for making an object detection based on sensor data and/or captured images can be used in the embodiments disclosed herein.

LiDAR information is communicated from LiDAR 264 to vehicle on-board computing device 220. Additionally, captured images are communicated from camera(s) 262 to vehicle on-board computing device 220. The LiDAR information and/or captured images are processed by vehicle on-board computing device 220 to detect objects in proximity to vehicle 102 (or AV 102). The manner in which the object detections are made by vehicle on-board computing device 220 includes such capabilities detailed in this disclosure.

Vehicle on-board computing device 220 may include and/or may be in communication with routing controller 231 that generates a navigation route from a start position to a destination position for an autonomous vehicle. Routing controller 231 may access a map data store to identify possible routes and road segments that a vehicle can travel on to get from the start position to the destination position. Routing controller 231 may score the possible routes and identify a preferred route to reach the destination. For example, routing controller 231 may generate a navigation route that minimizes Euclidean distance traveled or other cost function during the route, and may further access the traffic information and/or estimates that can affect an amount of time it will take to travel on a particular route. Depending on implementation, routing controller 231 may generate one or more routes using various routing methods, such as Dijkstra's algorithm, Bellman-Ford algorithm, or other algorithms. Routing controller 231 may also use the traffic information to generate a navigation route that reflects expected conditions of the route (e.g., current day of the week or current time of day, etc.), such that a route generated for travel during rush-hour may differ from a route generated for travel late at night. Routing controller 231 may also generate more than one navigation route to a destination and send more than one of these navigation routes to a user for selection by the user from among various possible routes.

In various embodiments, vehicle on-board computing device 220 may determine perception information of the surrounding environment of AV 102. Based on the sensor data provided by one or more sensors and location information that is obtained, vehicle on-board computing device 220 may determine perception information of the surrounding environment of AV 102. The perception information may represent detected objects that an ordinary driver would perceive in the surrounding environment of a vehicle. The perception data may include information relating to one or more objects in the environment of AV 102. For example, vehicle on-board computing device 220 may process sensor data (e.g., LiDAR or RADAR data, camera images, etc.) in order to identify objects and/or features in the environment of AV 102. The objects may include traffic signals, road way boundaries, other vehicles, pedestrians, and/or obstacles, etc. Vehicle on-board computing device 220 may use any now or hereafter known object recognition algorithms, video tracking algorithms, and computer vision algorithms (e.g., track objects frame-to-frame iteratively over a number of time periods) to determine the perception.

In some non-limiting embodiments, vehicle on-board computing device 220 may also determine, for one or more identified objects in the environment, the current state of the object. The state information may include, without limitation, for each object: current location; current speed and/or acceleration: current heading; current pose; current shape, size, or footprint; type (e.g., vehicle vs. pedestrian vs. bicycle vs. static object or obstacle); and/or other state information.

Vehicle on-board computing device 220 may perform one or more prediction and/or forecasting operations. For example, vehicle on-board computing device 220 may predict future locations, trajectories, and/or actions of one or more objects. For example, vehicle on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, AV 102, the surrounding environment, and/or their relationship(s).

In various embodiments, vehicle on-board computing device 220 may determine a motion plan for the autonomous vehicle. For example, vehicle on-board computing device 220 may determine a motion plan for the autonomous vehicle based on the perception data and/or the prediction data. Specifically, given predictions about the future locations of proximate objects and other perception data, vehicle on-board computing device 220 can determine a motion plan for AV 102 that best navigates the autonomous vehicle relative to the objects at their future locations.

In some non-limiting embodiments, vehicle on-board computing device 220 may receive predictions and make a decision regarding how to handle objects and/or actors in the environment of AV 102. For example, for a particular actor (e.g., a vehicle with a given speed, direction, turning angle, etc.), vehicle on-board computing device 220 decides whether to overtake, yield, stop, and/or pass based on, for example, traffic conditions, map data, state of the autonomous vehicle, etc. Furthermore, vehicle on-board computing device 220 also plans a path for AV 102 to travel on a given route, as well as driving parameters (e.g., distance, speed, and/or turning angle). That is, for a given object, vehicle on-board computing device 220 decides what to do with the object and determines how to do it. For example, for a given object, vehicle on-board computing device 220 may decide to pass the object and may determine whether to pass on the left side or the right side of the object (including motion parameters such as speed). Vehicle on-board computing device 220 may also assess the risk of a collision between a detected object and AV 102. If the risk exceeds an acceptable threshold, it may determine whether the collision can be avoided if the autonomous vehicle follows a defined vehicle trajectory and/or one or more dynamically generated emergency maneuvers is performed in a pre-defined time period (e.g., N milliseconds). If the collision can be avoided, then vehicle on-board computing device 220 may execute one or more control instructions to perform a cautious maneuver (e.g., mildly slow down, accelerate, or change lane). Vehicle on-board computing device 220 may execute one or more control instructions for execution of an emergency maneuver (e.g., brake and/or change direction of travel).

As discussed above, planning and control data related to maneuvering the autonomous vehicle in the roadway is generated for execution. Vehicle on-board computing device 220 may for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-board controller and/or vehicle control system. Examples of such other computing devices include an electronic device (such as, a smartphone) associated with a person who is riding in the vehicle, as well as, a remote server that is in electronic communication with the vehicle via a wireless network. The processor of any such device may perform the operations that will be discussed below.

FIG. 3 illustrates a flowchart of a non-limiting embodiment or aspect of process 300 for streaming data mining with text-image joint embeddings in autonomous vehicle systems (e.g., self-driving systems of FIG. 1, and an autonomy vehicle control stack, sensors, or control systems of FIG. 2, and/or the like) and other AV applications. In some non-limiting embodiments or aspects, one or more of the steps of process 300 for streaming data mining with text-image joint embeddings is performed (e.g., completely, partially, and/or the like) by AV 102 (e.g., on-board computing device 112, one or more devices of AV 102, information generated from and/or received from AV 102, etc.). In some non-limiting embodiments or aspects, one or more of the steps of process 300 may be performed (e.g., completely, partially, and/or the like) by, include communications from, or information obtained from one or more components or elements of AV system architecture 200 of FIG. 2, one or more processors of a self-driving system of AV 102, or based on information received from autonomy systems (e.g., data related to an on-board autonomous vehicle system, data related to an on-board autonomous vehicle service provider, data related to a device of on-board autonomous vehicle system, data about an on-board vehicle service, data related to an on-board vehicle controller or software program, data related to a sensor of an on-board vehicle system, or diagnostic information about any of the above identified systems, and/or the like.

As shown in FIG. 3, at step 302, process 300 may include obtaining a roadway dataset. In some non-limiting embodiments or aspects, obtaining a roadway dataset that includes a plurality of records and each record in the roadway dataset includes an image logged by an autonomous vehicle (AV) in a roadway. For example, remote computing device 120 (e.g., one or more processors of AV 102, one or more components of AV 102, one or more applications of AV 102, one or more models of AV 102, one or more inference engines of AV 102, one or more processors of remote computing device 120, one or more components of remote computing device 120, one or more applications of remote computing device 120, one or more models of remote computing device 120, one or more inference engines of remote computing device 120, etc.) obtains a roadway dataset, such that each record in the roadway dataset includes an image logged by an autonomous vehicle (AV) in a roadway.

In some non-limiting embodiments or aspects, remote computing device 120 identifies a condition in a roadway (e.g., in roadway dataset, etc.) based on an operation of one or more AVs 102 that may be further optimized to improve performance of the one or more AVs 102. In such an example, a condition that is defined by one or more independent variable or factors may be used to find additional images. For example, a condition may be associated with information about where or when (e.g., what city, road segment identifier, hour of day, season, weather, objects present, etc.) the condition occurred or where the condition occurred with higher frequency or a specific frequency, depending on what is happening normally in the wild. For example, a Global Positioning System ("GPS") may be used to indicate a point, around which information to be collected may exist (e.g., based on sensor input, etc.), for example, in a radius around an area.

Remote computing device 120 may obtain a roadway dataset by detecting and collecting on-board image data in the roadway associated with a condition, such as a sidewalk in proximity to (e.g., adjacent, near, next to, abutting, touching, etc.) the roadway, an image of a physical barrier or by separation, a condition associated with a travel lane (e.g., a lane upon which a vehicle travels, a traffic lane, etc.), a parking lane (e.g., a lane in which a vehicle parks), a turning lane (e.g., a lane in which a vehicle turns from), one or more lanes in which a pedestrian, bicycle, or other vehicle may travel, such as, a crosswalk, a bicycle lane (e.g., a lane in which a bicycle travels), a mass transit lane (e.g., a lane in which a bus may travel), a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.).

Additionally, remote computing device 120 may obtain a roadway dataset based on one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, a condition associated with dense traffic, where successfully completing a lane change may require a complex maneuver, like speeding up, slowing down, stopping, or abruptly turning, for example, to steer into an open space between vehicles, pedestrians, or other objects (as detailed herein) in a destination lane, a condition associated with a lane split, an intersection (e.g., a three-leg, a four-leg, a multi-leg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns, etc.), merging lanes (e.g., two lanes merging to one lane, one lane ends and merges into a new lane to continue, etc.), a condition associated with a traffic speed of objects in the roadway, a condition associated with current traffic direction (e.g., anti-routing traffic, wrong-way driving, or counter flow driving, where a vehicle is driving against the direction of traffic and/or against the legal flow of traffic), a condition associated with accidents or other incidents in the roadway, weather conditions in the geographic area (e.g., rain, fog, hail, sleet, ice, snow, etc.), or road construction projects.

Still further, remote computing device 120 may obtain a roadway dataset based on a condition associated with an object to avoid in proximity to a road, such as, structures (e.g., a building, a rest stop, a toll booth, a bridge, etc.), traffic control objects (e.g., lane markings, traffic signs, traffic lights, lampposts, curbs of the road, gully, a pipeline, an aqueduct, a speedbump, a speed depression, etc.), a lane of a roadway (e.g., a parking lane, a turning lane, a bicycle lane, etc.), a crosswalk, a mass transit lane (e.g., a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

In some non-limiting embodiments or aspects, images of a roadway dataset are introduced for training one or more algorithms. In such an example, streaming data mining with text-image joint embeddings extends the time of travel for the AV, as automatic labeling of images may omit or capture a collection of the images that are not of interest. Triggers in an AV prompt the sampling and collection of images, such as random collections or configuration based collections. For configuration based collections, a configuration file (e.g., a communication) is sent to a car to trigger operations when an AV drives on a particular lane segment or at a particular time. The operation may be an action to log the lane segment, similar segments, and/or the like. In some non-limiting embodiments or aspects, AV 102 or a system of AV 102 may include a buffer to account for a delay and the buffer makes it possible to log information before and after the trigger. In some examples, AV 102 may label such information as it is collected or during a collection.

In some non-limiting embodiments or aspects, AV 102 may collect an image based on the condition associated with the operation of one or more AVs 102 that may be further optimized to improve performance of the one or more AVs. In another example, an operation of the one or more AVs 102 that may be further optimized to improve performance includes at least one of detection (e.g., finding out where an object is exactly in the environment surrounding the one or more AVs), classification (e.g., determining what exactly an object is), tracking (e.g., observing the moving objects in the environment, such as other vehicles, pedestrians, etc. as described above), segmentation (e.g., matching each pixel in an image with a schematic category, such as a road, sky, other vehicles, etc.).

In some non-limiting embodiments or aspects, remote computing device 120 retrieves or obtains images in a stream of on-board image data, such images may not be easily described by a word ontology, may require many words to search, may include multiple concepts, and/or the like. The query could directly come from an image prototype (e.g., an image including a feature to search, etc.) found on the web, or the same images and text descriptions that would be provided to a labelling operator.

Returning to FIG. 3, at step 304, process 300 may include generating based on a text-image model, an embedding dataset comprising a plurality of image embeddings, and each image embedding identifies a point in a high dimension space. In some non-limiting embodiments or aspects, for example, AV 102 (e.g., one or more processors of AV 102, one or more components of AV 102, one or more applications of AV 102, one or more models of AV 102, one or more inference engines of AV 102, one or more processors of remote computing device 120, one or more components of remote computing device 120, one or more applications of remote computing device 120, one or more models of remote computing device 120, one or more inference engines of remote computing device 120, etc.) generates an embedding dataset based on a text-image model comprising a plurality of image embeddings, and each image embedding identifying a point in a high dimension space.

In some non-limiting embodiments or aspects, remote computing device 120 generates an embedding dataset based on a text-image model. For example, the embedding dataset may include a plurality of image embeddings generated from the roadway dataset. In such an example, an image embedding may comprise a structure having a relatively low-dimensional space into which high-dimensional vectors may be translated, such as, for example, embeddings comprising dense numerical representations of real-world objects and relationships, expressed as a vector, like large inputs like vectors (e.g., sparse vectors, etc.) representing words. In some examples, an embedding captures some of the semantics of the input image or query by placing semantically similar inputs close together in an embedding space associated with the input.

In some non-limiting embodiments or aspects, an embedding or embedding space may be learned and reused across models.

In some non-limiting embodiments or aspects, the high dimension space (e.g., vector space, etc.) quantifies the semantic similarity between images. Embedding vectors of images that are close to each other are considered similar. Sometimes, they may be used directly for finding similar images. Other times, embeddings may be passed to other models. In such cases, a model may be shared and learning is reused across similar items, such as similar models, rather than treating them as two completely unique categories. For this reason, embeddings can be used to accurately represent sparse data like image streams as features to downstream models.

In some non-limiting embodiments or aspects, embedding vectors of text (e.g., text embeddings, etc.) and embedding vectors of images (e.g., image embeddings, etc.) that are close to each other are considered similar.

In some non-limiting embodiments or aspects, the high dimension space is a multi-dimensional space encompassing features identified to or by machine learning in one or more deep learning models (e.g., deep learning networks that are trained on billions of images on the internet, etc.). For example, visual and textual networks made available by open AI (i.e., a research company in the field of artificial intelligence with the stated goal of promoting and developing friendly AI in a way that benefits humanity as a whole) provide open source programs for matching images and text.

In some non-limiting embodiments or aspects, AV 102 (e.g., AV on-board computing device 112, remote computing device 120, etc.) uses a database (e.g., database 122, etc.) of neural image embeddings generated with advances in contrastive learning, to learn joint text-image embeddings, such as, for example using models such as CLIP as published by Radford et al. in the paper titled "Learning Transferable Visual Models From Natural Language Supervision", 2021, arxiv.org (https://arxiv.org/pdf/2103.00020.pdf), the entire contents of which are incorporated by reference, which are trained on billions of text caption image pairs crawled and curated from the internet as published by Romain Beaumont, in the paper titled "Laion-5b: A New Era Of Open Large-Scale Multi-Modal Datasets", December 2022, available at (https://laion.ai/blog/laion-5b/), the entire contents of which are incorporated by reference. Models such as CLIP are in fact 2 models. The first is a text embedding model, which takes natural language (in the form of text characters) and map this into a fixed size "embedding", a vector of floating point numbers of a given length. The second model is an image embedding model, which instead takes an image and also maps this into a fixed size embedding of the same dimension as the text embedding. During training, the two embeddings produced by the text and image branches are optimized such that each text-image pair from the training dataset map to the same point in the embedding space. In other words, once trained the embedding space is "shared" between two modalities (text and image).

In some non-limiting embodiments or aspects, a foundation model is a large artificial intelligence model trained on a plurality of unlabeled data (e.g., a vast quantity of unlabeled data, etc.) at scale resulting in a model that can be adapted to a wide range of downstream tasks, such as identifying an image for an input query text. Foundational problems are trained for structures without manual labeling of what is in the image (e.g., using internet associations, the whole English dictionary, and/or may suppress an object that may not have a single word to describe it. The embedding is an amalgamation of the image and may also match one or a combination of different words in the dictionary to form the embeddings.

In some non-limiting embodiments or aspects, an embedding is a hash or some kind of hash function (e.g., a continuous function, etc.) which obtains a big image that is comprised of millions of pixels, all that have 256 possible numbers, billions of combinations, and compacts each image down to a vector of 512 numbers.

The foundational problem is treated as an approximation of what it would mean to have an open world object detector (OWOD), a challenging computer vision problem, where the task is to detect a known set of object categories while simultaneously identifying unknown objects. However, it is not an open world object detector because it is not actually detecting, but rather compressing an image in space.

In some non-limiting embodiments or aspects, compressing the image and input query text embeddings into a high dimensional space may cause the image and input query text to be located (e.g., sit in, positioned in, etc.) in the same neighborhood in a high dimensional space as other images or input query text that may be similar.

The dataset may include images that are both labeled and unlabeled images. Searching for a searchable string enables sorting on topics or keywords, or otherwise finding a specific image related to that topic. In one example, remote computing device 120 may determine a parametric for an input query text in order to find an unlabeled image, or may additionally use the unlabeled images to determine accuracy of a high probability area representing a particular text query in a high dimension space. Remote computing device 120 may determine the sufficiency of a parametric for an input query text.

In another example, remote computing device 120 may determine the nearest neighbors that may not be labeled (e.g., are not in training data set, etc.). For example, the system is used to search for a particular entity of interest and is likely to pick one or more images that can be labeled.

In some non-limiting embodiments or aspects, remote computing device 120 may be configured with dual modality, such as, for example, to perform a query for "red stop sign", which may be transformed into a text embedding to determine information about images in the database. In some cases, an image may include subject matter (e.g., content, features, etc.) that may be associated with multiple text queries. For example, when searching for a dog or fire hydrant, many images may contain both concepts jointly.

Alternatively, a particular image can be used through the image branch. A text embedding (e.g., hash, vector, etc.) will return a similar or same embedding to an image having similar subject matter (e.g., features, etc.). In some examples, it may be better to text one or the other (e.g., one or more images or image information, etc.). For example, if the word (or words) is very descriptive of a concept to describe, for example, a search for "Apple" in an input text query, may be unclear, as that may mean a type of shiny red fruit or a tech company, among others. However, with a visual image of the Apple logo, the exact visual feature is searched.

In some non-limiting embodiments or aspects, remote computing device 120 generates each record in the embedding dataset, such that each record may include at least one image embedding and a link to a specific image which visualizes the image embedding.

In some non-limiting embodiments or aspects, remote computing device 120 encodes an image to provide the image embedding for a corresponding image logged by AV 102 in the roadway dataset, and the image embedding represents an image embedding point in the high dimension space (e.g., a plurality of image features, at least one of which may be used to search and group a search result, etc.). For example, remote computing device 120 may precompute the embeddings for images in the archives (e.g., a roadway dataset, etc.), this eliminates a requirement for labeling. New images need not be labelled with additional metadata, they can be raw images collected from many drives and cities that are matched to the image embeddings for the images in the archives.

In some non-limiting embodiments or aspects, remote computing device 120 generates an image embedding for an image that is comprised of millions of pixels, each of which may have 256 possible numbers, with a result that accounts for billions of combinations. Embedding comprises a compacting of an image down to a vector of 512 numbers.

The embeddings can be stored in database 122 that is rapidly searchable, such as for nearest neighbors (i.e. using approximate KD-trees, etc.).

In some non-limiting embodiments or aspects, to promote searchability in images across scales, not only does remote computing device 120 embed the entire image, but also patches of it are embedded, for example, by slicing an image into many parts and generating an embedding for each part. For example, by dividing up the image into a 3×3 grid, a 5×5 grid, and/or the like, a yield of the embedding effectively increases, such as, yielding 35 (1+9+25) embeddings per image at various scales.

Remote computing device 120 may scale more granular portions of an image to define more sufficiently inclusive and accurate searches. For example, remote computing device 120 slices at least one image of the roadway dataset into a plurality of image slices. Remote computing device 120 encodes each of the plurality of image slices. The plurality of image slices may include a metadata label, and each image in the dataset may be an AWS link to a particular file with the unique hash (512 numbers) describing it.

In some non-limiting embodiments or aspects, remote computing device 120 obtains or generates a label database from previously labeled data which was collected by the AV (e.g., a large pool of unlabeled data, etc.). For example, remote computing device 120 or AV 102 may obtain on-board image data, by obtaining streaming images collected by AV 102 and/or fleets of AVs 102, in accordance with step 302 above. Previously labeled data that was collected by AV 102 may be used to cross check input query text searches.

Again with reference to FIG. 3, at step 306, process 300 may include determining a parametric description of a high probability field which surrounds a query input point in the high dimension space. For example, in some non-limiting embodiments or aspects, AV 102 (e.g., one or more processors of AV 102, one or more components of AV 102, one or more applications of AV 102, one or more models of AV 102, one or more inference engines of AV 102, one or more processors of remote computing device 120, one or more components of remote computing device 120, one or more applications of remote computing device 120, one or more models of remote computing device 120, one or more inference engines of remote computing device 120, etc.) determines a parametric description of a high probability field which surrounds a query input point in the high dimension space.

In some non-limiting embodiments or aspects, remote computing device 120 identifies each input image in the input stream of images that resembles (e.g. within a similarity threshold, etc.) the query input text in the high dimension space at a point (e.g., position, location, in an area, etc.) that is within a threshold distance to a point in the high probability field representing the query input text. In some examples, remote computing device 120 ranks or scores each input image identified in the input stream of images that resembles the query input text in the high dimension space at a point (e.g., position, location, in an area, etc.) that is within a threshold distance to a point in the high probability field representing the query input text. In alternative examples, remote computing device 120 removes (e.g., deletes, ignores, communicates a removing step, etc.) from the result set each input image in the input stream of images that does not resemble the query input text in the high dimension space at a position outside the threshold distance to the point in the high probability field representing the query input text that is outside the threshold distance.

In some non-limiting embodiments or aspects, remote computing device 120 transfers, obtains, or receives the query input text for identifying images, such as a parsed version of the query. When input (e.g., a parametric representation, an image representation, etc.) is received, the server parses the parameters of the query input sent to the request and returns the effective or specified data as a result of the search. In some examples, the search is performed based on the subject matter of the query input in the embedding dataset.

In a streaming system, ranking of the images in the stream may not be performed until after the images have been identified. When very little data is available, the mean may cause a high distribution. For example, uncertainty about the real mean may cause a high distribution of images.

In some non-limiting embodiments or aspects, remote computing device 120 determines an embedding of each input image in an on-board image dataset, or each input matching an input query text, as further described above in association with the description of step 302 and 304. For example, an image embedding is determined for an unlabeled, previously collected record, and/or the like.

In some non-limiting embodiments or aspects, remote computing device 120 determines a parametric description of a high probability field which surrounds a query input point in a high dimension space. For example, a plurality of image embeddings of a plurality of roadway datasets are taken and combined to form a parametric description of an area in a high dimension space. For example, a plurality of image embeddings are combined to determine the high probability field which is generated for a particular search (e.g., text, image, etc.), the high probability field including or predicted to include one or more features of interest found or combined from the plurality of image embeddings.

In some non-limiting embodiments or aspects, remote computing device 120 determines a likelihood that an image is in an embedding space by comparing an image from the input stream of images with a pre-computed embedding distribution. In some examples, remote computing device 120 may save (e.g., label, save, store, score, rank, etc.) or reject (e.g., skip, mark as not read, not matching, etc.) the image from the input streaming data (e.g., the data sample). For example, the data sample is labeled or otherwise indicates that the image from the input stream of images resides in the pre-computed embedding distribution.

In some non-limiting embodiments or aspects, remote computing device 120 receives, obtains, or determines an input query text. For example, the input query text identifies features to search for, which may be expected or desired (i.e., a logo, a traffic sign, a vehicle, a sign color, etc.), and may be used to query and/or find exemplary images in a high dimension space (e.g., one or more inputs, one or more strings, one or more parametric, etc.), associated with images to retrieve in the input stream of images. In some examples, remote computing device 120 generates a text query embedding to find or identify a query input point by encoding the query input text.

Once embeddings of the images and the input query text are generated, the similarity between embeddings (e.g. text embeddings, image embeddings, combinations of text/image embeddings, image/image embeddings, text/text embeddings, etc.) is measured, statistical methods for the similarity of embeddings can be used. Such techniques, for example, are cosine similarity, Euclidean distance, Jaccard distance, word mover's distance, and/or the like.

In some non-limiting embodiments or aspects, remote computing device 120 determines a distance between the query input point and each image embedding of the embedding dataset. In some examples, remote computing device 120 scales data using different embeddings to get better perspective of data, such as to identify multiple classes in the data. For example, embedding for a first query input text may provide different distances than embeddings found for a second query input text.

For example, remote computing device 120 calculates the distance between a query input text embedding and each of the image embeddings to create a distance distribution (e.g., distance function, etc.). In such an example, images that closely resemble the query will reside a short distance from the input query text in the high dimensional space, while images that are very different may have a large distance between them.

A distance distribution is a measure for the difference (or distinction) between two different objects from the same dataset (e.g., a distance between each image embedding and an input query text, a distance to a parametric description of the image in a high probability field, and/or the like). The larger the distance, the more different the two objects are. A similarity function may be used to measure the resemblance between two different objects from the same data set. The larger the similarity, the more alike the two objects are. For instance, given two points in Cartesian coordinates, the distance between them can be measured using the Euclidean distance, while the similarity can be measured using the dot-product operation.

Figure 5:
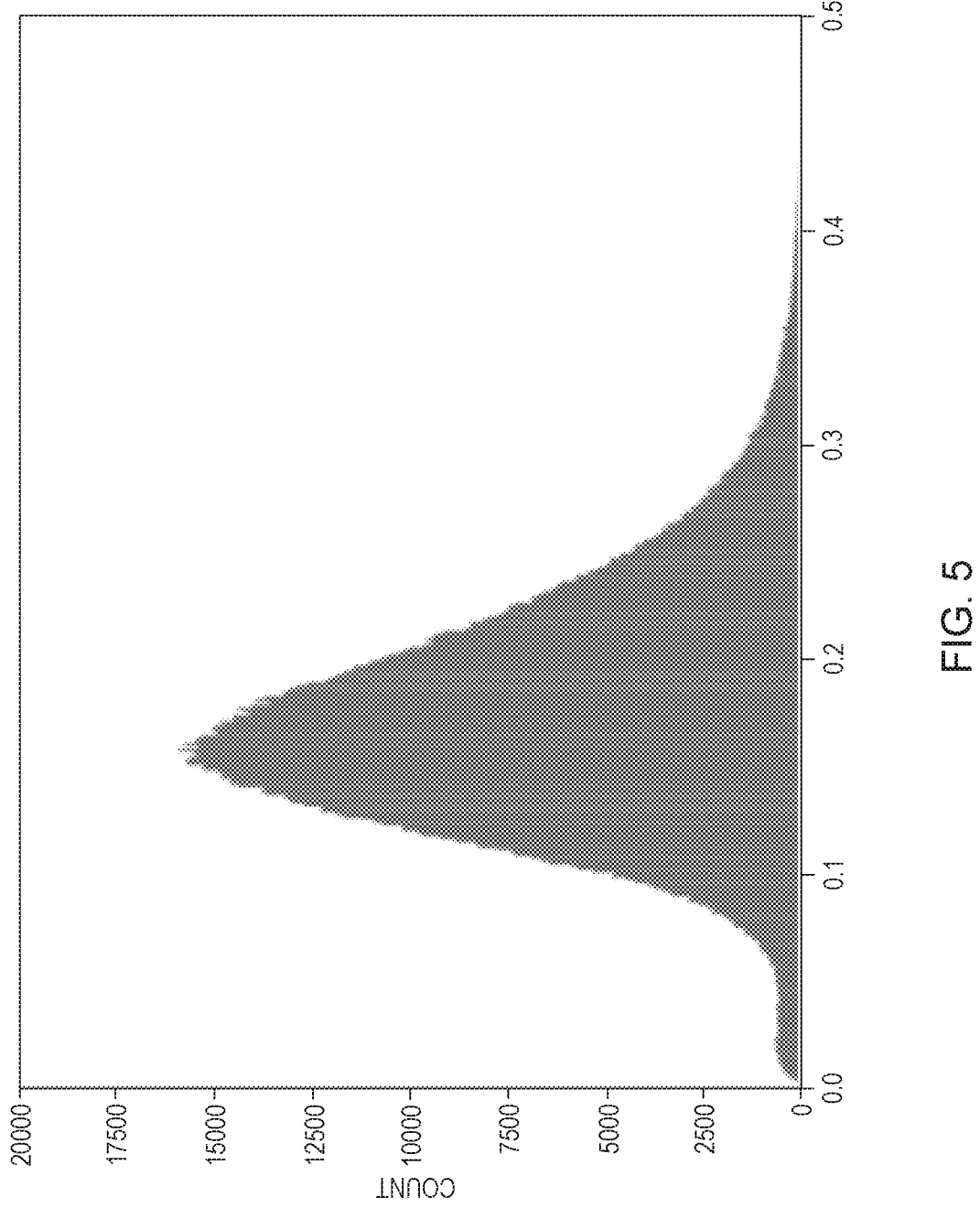
FIG. 5 illustrates non-limiting embodiments or aspects of a distance distribution in which systems, apparatuses, and/or methods, of streaming data mining with text-image joint embeddings as described herein, may be implemented.

Once the distance or alternatively similarity functions are calculated, they are normalized (e.g., converted to a normal distribution, etc.), an example of which is shown in FIG. 5.

In some non-limiting embodiments or aspects, remote computing device 120, generates a normal distribution of the distance or similarity function. The normal distribution is characterized by its mean and standard deviation, such that the distribution is not skewed and exhibits kurtosis (e.g., high kurtosis may exhibit a heavy tail (e.g., outliers, etc.), while low Kurtosis may have a light tail, or lack of outliers.) This makes the distribution symmetric and it is depicted as a bell-shaped curve when plotted. A normal distribution is defined by a mean (i.e., average) of zero and a standard deviation of 1.0, with a skew of zero and kurtosis=3. In a normal distribution, approximately 68% of the data collected will fall within +/−one standard deviation of the mean; approximately 95% within +/−two standard deviations; and 99.7% within three standard deviations. Unlike the binomial distribution, the normal distribution is continuous, meaning that all possible values are represented (as opposed to just 0 and 1 with nothing in between).

In some non-limiting embodiments or aspects, for multiple images, remote computing device 120 generates or creates a distance distribution (or similarity distribution) for each image query example. For example, a text query or image of the bicycle are used to search the database. During the search, a nearest neighbor search is determined. For example, the top images (e.g., top 1000, 500, 100, etc.) that are closest to the embedding's that are closest to the image of the bicycle. However, looking for nearest neighbors in the database is quite expensive especially if the database is large and only provides results with respect to the data in the database.

In some non-limiting embodiments or aspects, remote computing device 120 listens, parses, and/or the like the stream of image data and very quickly invoke a label or forego a label, parametrically while leveraging the database itself.

Remote computing device 120 calculates the embedding distribution based on the union of the samples selected by the percentile filtering per image query (after deduplication). In this example, a query is not limited to one text or image, and may include a combination image or text queries together.

In some non-limiting embodiments or aspects, a probability field is generated, so that for a given sample, it can be shown how likely the sample is to occur, for example, to say an object or vehicle, such as a cycle is more probabilistically expected (e.g., find a top or bottom percent of queries, etc.). For example, remote computing device 120 fits the parametric distribution for the top 1000 retrievals. However, if it is a rare class, the data retrieved may be quite noisy, may have a couple images with desired images (e.g., the searched image or text, etc.), but the rest is random images.

In some non-limiting embodiments or aspects, remote computing device 120 start with an uncertainty and to may start iteratively and build after results are analyzed, with a soft target, by taking the top 1%, 1000, or even 5000 if the class is very rare (e.g., if the input query text or input query image, etc., is rare).

In some non-limiting embodiments or aspects, remote computing device 120 calculates the mean and variance (e.g., if using a normalized distance distribution) and then provides instructions to label everything that is within that distribution. This will skew the chance of receiving similar data in the future. In such an example, remote computing device 120 may then recalculate the distribution at a regular cadence. In such an example, remote computing device 120 may determine how quickly things are ingested on a given cadence. In this way, a filter is generated out of uncertainty to sample the data, so that the data is a little more biased then what you are looking for (e.g., filled with data that is desirable to collect, etc.). The variance may be moving closer to the mean.

For fire hydrants, not an uncommon object, it can be seen that the spread in the embedding space is quite low, allowing it to be a little selective in finding image embeddings very close to the mean (e.g., the calculated standard deviation of the top 1000 is very low).

Once the image embeddings are fit to the model, it is very inexpensive to compute. For example, remote computing device 120 does not have to go to the database and use the embedding's each time to calculate a new query space. Different uses may be interested in different fittings, for each of the queries can have a different parametric configuration. For example, for dogs and fire hydrants, it is a compound object but does not matter, since a high probability point may sit somewhere in the middle of the two objects (dogs and fire hydrants). In such an example, the spread may be quite wide, returning images associated with dogs and with fire hydrants, and somewhere in between these two concepts will be the combination of the concepts.

In some non-limiting embodiments or aspects, the high probability field includes at least one of a spread, a top percentage of probable records, a range representing an area of the high probability field, and/or the like. For example, remote computing device 120 determines that each image in the input stream of images is in the high probability field (e.g., should be labeled, etc.) or otherwise eliminates an input image (e.g., no label, etc.).

In some non-limiting embodiments or aspects, each input image in the input stream of images that resembles the query input text comprises a point in the high dimension space at a position within a threshold distance of a point in the high probability field representing the query input text.

In some non-limiting embodiments or aspects, each input image in the input stream of images that does not resemble the query input text comprises a point in the high dimension space at a position outside the threshold distance of the point in the high probability field representing the query input text that is outside the threshold distance.

In some non-limiting embodiments or aspects, remote computing device 120 may score in a probabilistic way the streaming data. Once the distribution (e.g., a normal distribution, a similarity distribution, etc.), is computed, the top 1% may be all cyclists, but the cyclists in the top 1% may all be different, so a little distance may exist (e.g., a spread) as to what a cyclist looks like may exist. A score that is closer to zero indicates that the images are similar (e.g., close in resemblance). However, sometimes images are similar while still without good matches. The foundational model learns or knows what a horse rider is, however, it may have a low probability of success because there may be very few if any horse riders in the database, causing the query to return results that may not be useful or accurate.

Alternatively, remote computing device 120 may score in a probabilistic way the streaming data, once the distribution (e.g., normal distribution) is computed. As an example, the top 1% of a search is all cyclists, however, they may all be different, a distance may exist (e.g., a spread) as to what a cyclist looks like, greater than if a same cycle or cyclist is detected multiple times. In similar examples, remote computing device 120 may score zero horse riders in the database, the score is very high because you won't have the second image within the distribution. There may be some that exist, that are far from zero, but those may be eliminated unless the search query includes a very rare aspect and increases the spread of the distribution.

Remote computing device 120 may also obtain and score an image found in, for example, an internet search for a horse rider on the street. Such an image may be obtained and fed to the database as a proxy after generating an image embedding for the image. In other examples, structured testing teams may mock information and test them and get data from that. This mock information may be input to the system to find similar items, which shows the database is working and will have a complete or more complete baseline to fit into.

In some non-limiting embodiments or aspects, once a parametric distribution is computed, the incoming image data (e.g., stream of input data, etc.) is processed and projected, such as, projecting to the embedding space. Then the likelihood is determined, by the image embedding in the embedding space, that the image from the input stream of images and the embedding distribution match, and how closely they match. Based on this determination, the image is stored (e.g., triggering labeling of the image, etc.) or discarded.

As shown in FIG. 3, at step 308, process 300 may include determining at least one input image of the input stream of images is in the high probability field. In some non-limiting embodiments or aspects, for example, AV 102 (e.g., one or more processors of AV 102, one or more components of AV 102, one or more applications of AV 102, one or more models of AV 102, one or more inference engines of AV 102, one or more processors of remote computing device 120, one or more components of remote computing device 120, one or more applications of remote computing device 120, one or more models of remote computing device 120, one or more inference engines of remote computing device 120, etc.) determines at least one input image of the input stream of images is in the high probability field.

In some non-limiting embodiments or aspects, remote computing device 120 determines the at least one input image of the input stream of images is an image with a parametric description determined to be located within the high probability field. For example, remote computing device 120 determines a parametric function (e.g., a parametric distribution, etc.) that includes a query input point that is associated with a query input text.

In some non-limiting embodiments or aspects, remote computing device 120 determines if an image embedding is in a high probability field based on parameters for each image embedding of the embedding dataset, such that each input image fitting the parametric description of the high probability field is positioned in the high probability field associated with the query input point.

In some non-limiting embodiments or aspects, an input query text comprises a textual description and a probability parameter. In some examples, the input query text is received from a remote computing device or a remote application. In some examples, the input stream of images is obtained or detected by the AV. In some non-limiting embodiments or aspects, the embedding of the input image in the input stream of images is compared by the AV to the parametric description of the high probability field to determine if the image is in the high probability field.

In some non-limiting embodiments or aspects, remote computing device 120 determines at least one input image of the input stream of images that is in the high probability field. For example, remote computing device 120 matches an input stream of images, including a hash of each input image in the input stream of images, with the parametric description of the high probability field to determine that each input image in the input stream of images is in the high probability field. Remote computing device 120 may determine a content of an input image of the input stream of images without comparing pixel values by comparing an embedding of the image in the input stream with at least one image embedding in the roadway dataset.

As shown in FIG. 3, at step 310, process 300 may include automatically labeling the at least one input image based on the query input text. In some non-limiting embodiments or aspects, for example, AV 102 (e.g., one or more processors of AV 102, one or more components of AV 102, one or more applications of AV 102, one or more models of AV 102, one or more inference engines of AV 102, one or more processors of remote computing device 120, one or more components of remote computing device 120, one or more applications of remote computing device 120, one or more models of remote computing device 120, one or more inference engines of remote computing device 120, etc.) automatically labels the at least one input image based on the query input text.

In some non-limiting embodiments or aspects, a roadway dataset includes one or more images collected by AV 102, or from the fleet of AVs 102, and/or image information gathered in the roadway. In some non-limiting embodiments or aspects, AV 102 is configured for accurate and efficient labeling of images, and may be configured to label only images that are relevant and useful for improving performance of AV 102 or an AV system performance (e.g., perception systems, detection systems, prediction systems, navigation systems, etc. of an AV), such that target images can be identified.

For example, remote computing device 120 identifies and labels each image that includes an image embedding in the high probability field. For example, label only images in the high probability field that satisfy an input text query or an image query, that are relevant and useful for improving navigation of AV 102, associated operations of AV 102, and/or the like.

In some non-limiting embodiments or aspects, AV 102 may determine one or more images that are not in the high probability field, and in response to determining that an image of the input stream of images that is not in the high probability field, determines not to label the image (e.g., a plurality of images, etc.).

In some non-limiting embodiments or aspects, remote computing device 120 labels each input image in the input stream of images that resembles (e.g. within a similarity threshold, etc.) the query input text in the high dimension space at a point (e.g., position, location, in an area, etc.) that is within a threshold distance to a point in the high probability field representing the query input text. In some examples, remote computing device 120 ranks or scores each input image identified in the input stream of images that resembles the query input text in the high dimension space at a point (e.g., position, location, in an area, etc.) that is within a threshold distance to a point in the high probability field representing the query input text. In alternative examples, remote computing device 120 removes (e.g., deletes, ignores, communicates a removing step, etc.) from the result set each input image in the input stream of images that does not resemble the query input text in the high dimension space at a position outside the threshold distance to the point in the high probability field representing the query input text that is outside the threshold distance.

In some non-limiting embodiments or aspects, remote computing device 120 automatically labels each input image in the input stream of images that resembles (e.g. matches is within a similarity threshold, etc.) the query input text in the high dimension space at a point (e.g., position, location, in an area, etc.) that is within a threshold distance to a point in the high probability field representing the query input text. In some non-limiting embodiments or aspects, remote computing device 120 sends an instruction to AV 102 to collect an input image in the roadway based on matching the query input text in the high dimension space at a position within a threshold distance of a point in the high probability field representing the query input text.

In some non-limiting embodiments or aspects, remote computing device 120 links each labeled input image in the input stream of images that resembles (e.g. within a similarity threshold, etc.) the query input text in the high dimension space at a point (e.g., position, location, in an area, etc.) that is within a threshold distance to a point in the high probability field representing the query input text to other sensor information. For example, remote computing device 120 links each input image in the input stream of images (e.g., images may use a timestamp as the row index, and the timestamp may be aligned with other sensor data measurements in the database where the row index is also the same timestamp). In such an example, a query of a time stamp can be used to align one row (e.g., representing a first type of sensor data collected at the same time as the input image under consideration, etc.) with other rows (e.g., representing a second type of sensor data collected at the same time as the input image under consideration, etc.) based on a time stamp. AV 102 may essentially learn that at a same point in time, other sensor measurements were collected and since they have parallel (e.g., in a time continuum, in space, etc.) data streams, if something is found in the image space, it may be used to find other linked data.

Figure 4:
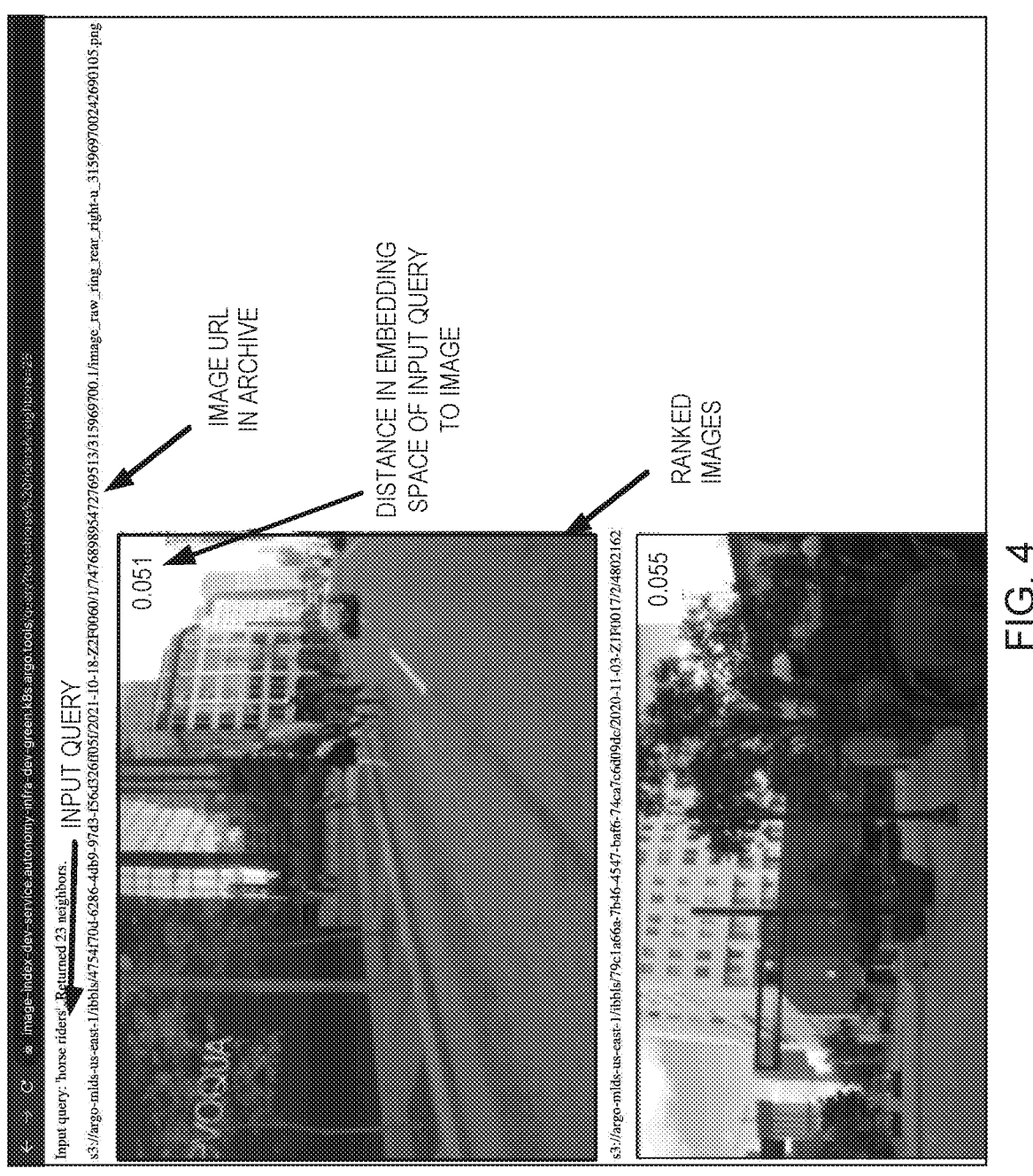
FIG. 4 illustrates non-limiting embodiments or aspects of a query interface for retrieval of images in which systems, apparatuses, and/or methods for streaming data mining with text-image joint embeddings, as described herein, may be implemented.

FIG. 4 illustrates an exemplary embedding space and corresponding URL for a first image 4-a. As shown, an input query 450 for "horse riders" generates a result (e.g., for the nearest twenty images in the database, nearest 100 images, etc.). For example, a first image 4-a, and a second image 4-b, may be members of a result set corresponding to the input query 450. For example, first image 4-a may illustrate an image of horses walking toward lens capturing the image, second image 4-b may illustrate a person leading a horse along a roadway (e.g., a roadway edge, etc.).

In some non-limiting embodiments or aspects, remote computing device 120 with new data either finds nearest neighbors of a new image and then checks for images with "horse riders", alternatively, checks if the new image contains horse riders, and then checks for nearest neighbors. In some non-limiting embodiments or aspects, the system can query the data to find a high probability area where it is likely (e.g., very likely, etc.) that the images in that area will contain horse riders. Then, the system queries if a point is in a very high probability region, and if it is, then it is probably within one of the "good" areas (e.g., meeting the criteria of a horse rider, etc.). If it is not in the high probability region, then it likely has nothing to do with horse riders.

For example, as shown in FIG. 4, the distance in embedding space of input query to first image 454, may be 0.051. In the same non-limiting embodiment, the embedding space of input query to first image 456 may be 0.056.

FIG. 5 illustrates an exemplary distance distribution of input query to other images in the database. As shown, given a top X percentile of distance similarity, or alternatively, the bottom X percentile of distance similarity, a subset of image embeddings in the database can be filtered. From the subset of filtered images, the system can determine a parametric embedding used to identify an image to label from a set of streaming images.

Figure 6:
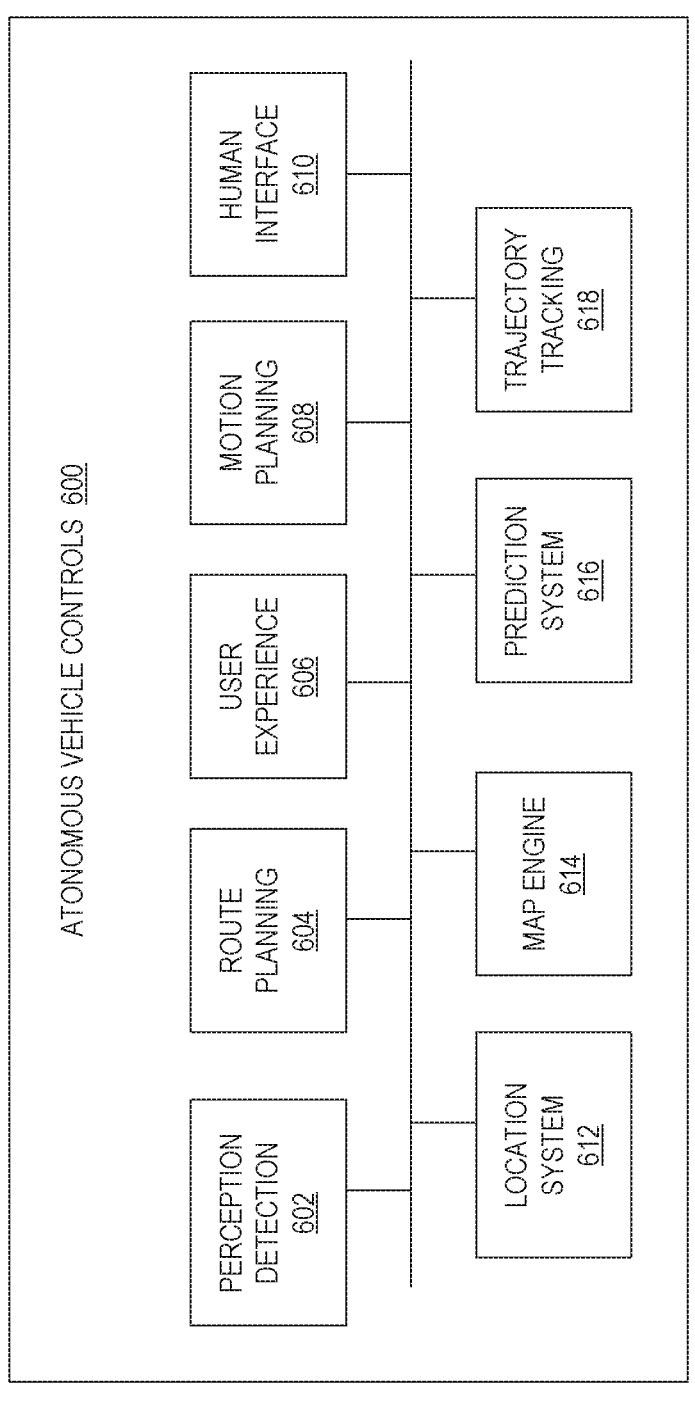
FIG. 6 provides a diagram of non-limiting embodiments or aspects of autonomous vehicle controls in which streaming data mining with text-image joint embeddings, as described herein, may be implemented to protect communications.

FIG. 6 illustrates an exemplary vehicle control system 600, in which devices, systems, and/or methods, described herein, may be implemented. Vehicle control system 600 may interconnect (e.g., establish a connection to communicate and/or the like) with on-board computing device 112, sensor system 110, user interface 116, or via communication interface 114 to remote data and processing systems (e.g., sources, computing devices, external computing systems, etc.) of database 122 (e.g., data store(s), etc.) and remote computing device 120 (e.g., central server(s), etc.), for example, vehicle control system 600 may utilize wired connections and/or wireless connections to provide an input or output exchange with local vehicle systems (e.g., one or more systems of AV 102, etc.).

With continued reference to FIG. 6, vehicle control system 600 may additionally or alternatively, communicate with components (e.g., shown in FIG. 2, etc.), such as, an engine, wheels, steering wheel, transmission, etc., which may be controlled, using a variety of communication signals and/or commands, such as, for example, acceleration signals or commands, deceleration signals or commands, steering signals or commands, braking signals or commands, and/or the like.

In some non-limiting embodiments or aspects, vehicle control system 600 includes components for autonomous operation of AV 102 to store or retrieve (e.g., request, receive, etc.) vehicle information from one or more data stores and/or one or more central servers. For example, vehicle control system 600 may synchronize (e.g., update, change, etc.) data, interfaces, map data, and/or the like as AV 102 is traversing a roadway. Multiple AVs 102 may be coupled to each other and/or coupled to data stores, to central servers, or to one another.

With continued reference to FIG. 6, autonomous vehicle controls 600 may receive data and provide instructions from one or more components comprising perception detection 602, location system 612, route planning 604, map engine 614, user experience 606, prediction system 616, motion planning 608, trajectory tracking 618, and human interface 610.

Location system 612 may obtain and/or retrieve map data (e.g., map information, one or more submaps, one or more maps for a geographic area, etc.) from map engine 614 which provides detailed information about a surrounding environment of the autonomous vehicle. Location system 612 may obtain detailed information about the surrounding environment of the autonomous vehicle. The map data can provide information regarding: the identity or location of different roadways, road segments, buildings, trees, signs, or other objects; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data (as described above) that provides information and assists AV 102 in analyzing a surrounding environment of the autonomous vehicle. In some non-limiting embodiments or aspects, map data may also include reference path information corresponding to common patterns of vehicle travel along one or more lanes such that a motion of an object is constrained to the reference path (e.g., locations within traffic lanes on which an object commonly travels). Such reference paths may be pre-defined, such as, the centerline of the traffic lanes. Optionally, the reference path may be generated based on historical observations of vehicles or other objects over a period of time (e.g., reference paths for straight line travel, lane merge, a turn, or the like).

In some non-limiting embodiments or aspects, location system 612 may also include and/or may receive information relating to a trip or route of a user, real-time traffic information on the route, and/or the like.

Location system 612 may also comprise and/or may communicate with route planning 604 for generating an AV navigation route from a start position to a destination position for AV cloud system. Route planning 604 may access map engine 614 (e.g., a central map data store stored in data pipeline) to identify possible routes and road segments where a vehicle may travel, to travel from a start position to a destination position. Route planning 604 may score the possible routes and identify a preferred route to reach the destination. For example, route planning 604 may generate a navigation route that minimizes a distance traveled or other cost function while traversing the route and may further access the traffic information and/or estimates that can affect an amount of time it will take to travel on a particular route. Depending on implementation, route planning 604 may generate one or more routes using various routing methods, such as, Dijkstra's algorithm, Bellman-Ford's algorithm, and/or the like. Route planning 604 may also use the traffic information to generate a navigation route which reflects an expected experience or condition of the route (e.g., current day of the week or current time of day, etc.), such that a route generated for travel during rush-hour may differ from a route generated for travel late at night. Route planning 604 may also generate more than one navigation route to a destination and send more than one of these navigation routes to user experience 606 for interfacing with a user (e.g., on a tablet, a mobile device, a vehicle device, etc.) for selection by a user from among various possible routes.

Perception detection 602 may detect information of the surrounding environment of AV 102 during travel from the start position to the destination along the preferred route, perception detection 602 may detect objects or other roadway characteristics based on sensor data provided by sensors (e.g., one or more detections, etc.) as shown and described with respect to FIG. 2, and information obtained by location system 612. The perception information represents what an ordinary driver perceives in the surrounding environment of a vehicle. The perception data may include information relating to one or more objects in the environment of the autonomous vehicle. For example, prediction system 616 may process sensor data (e.g., from LiDAR, RADAR, camera images, etc.) in order to identify objects and/or features in and around the geospatial area of the autonomous vehicle. Detected objects may include traffic signals, roadway boundaries, vehicles, pedestrians, obstacles in the roadway, and/or the like. Perception detection 602 may use known object recognition and detection algorithms, video tracking algorithms, or computer vision algorithms (e.g., tracking objects frame-to-frame iteratively over a number of time periods, etc.) to perceive an environment of AV 102.

In some non-limiting embodiments or aspects, perception detection 602 may also determine, for one or more identified objects in the environment, a current state of the object. The state information may include, without limitation, for each object: current location; current speed and/or acceleration; current heading; current orientation; size/footprint; type (e.g., vehicle vs. pedestrian vs. bicycle vs. static object or obstacle); and/or other state information.

Prediction system 616 may predict the future locations, trajectories, and/or actions of such objects perceived in the environment, based at least in part on perception information (e.g., the state data for each object) received from perception detection 602, the location information received from location system 612, sensor data, and/or any other data related to a past and/or current state of an object, the autonomous vehicle, the surrounding environment, and/or relationship(s). For example, if an object is a vehicle and the current driving environment includes an intersection, prediction system 616 may predict whether the object will likely move straight forward or make a movement into a turn, in a direction of a crossing lane, and/or the like. If the perception data indicates that the intersection has no traffic light, prediction system 616 may also predict whether the vehicle may fully stop prior to entering the intersection. Such predictions may be made for a given time horizon (e.g., 5 seconds in the future). In certain embodiments, prediction system 616 may provide the predicted trajectory or trajectories for each object to motion planning 608.

Motion planning 608 determines a motion plan for AV 102 based on the perception data, prediction data, sensor data, location data, map data, and/or the like. Specifically, given predictions about the future locations of proximate objects and other perception data, motion planning 608 can determine a motion plan (e.g., a trajectory, candidate trajectories, etc.) for autonomously navigating a route relative to one or more objects in their present and future locations.

In some examples, motion planning 608 may receive one or more predictions from prediction system 616 and make a decision regarding how to handle one or more objects in the environment surrounding AV 102. For a particular object (e.g., a vehicle with a given speed, direction, turning angle, etc.), motion planning 608 determines whether to overtake, yield, stop, and/or pass, based on, for example, traffic conditions, location, state of the autonomous vehicle, and/or the like. In some non-limiting embodiments or aspects, for a given object, motion planning 608 may decide a course to handle the object and may determine one or more actions for responding to the presence of the object. For example, for a given object, motion planning 608 may decide to pass the object and then may determine whether to pass on the left side or right side of the object (including motion parameters, such as, speed and lane change decisions). Motion planning 608, in connection with trajectory tracking 618, may also assess a relationship between a detected object and AV 102 before determining a trajectory. Depending on the relationship (e.g., an assessment within an acceptable threshold, etc.), AV 102 may determine to avoid an object by navigating a defined vehicle trajectory and/or implementing one or more dynamically generated maneuvers performed in a pre-defined time period (e.g., N milliseconds) to compensate for the objects predicted motion. In some examples, autonomous vehicle controls 600 are used to generate appropriate control instructions for executing a maneuver (e.g., mildly slow down, accelerate, change lane, turn, etc.). In contrast, depending on a location of an object (e.g. a pose of the object in the roadway, etc.), AV 102 may be controlled to stop or change direction of travel.

Trajectory tracking 618 observes a trajectory (e.g., trajectory generation) for an autonomous vehicle while AV 102 is traversing a pre-defined route (e.g., a nominal route generated by route planning 604, etc.). The trajectory specifies a path for the autonomous vehicle, as well as, a velocity profile. AV 102 converts the trajectory into control instructions for AV 102, including but not limited to throttle/brake and steering wheel angle commands for the controls shown in FIG. 2. Trajectory generation includes decisions relating to lane changes, such as, without limitation, whether a lane change is required, where to perform a lane change, and when to perform a lane change. Specifically, one objective of motion planning 608 is to generate a trajectory for motion of the vehicle from a start position to a destination on the nominal route, taking into account the perception and prediction data.

Motion planning 608 may generate a trajectory by performing topological planning to generate a set of constraints for each of a plurality of topologically distinct classes of trajectories, optimizing a single candidate trajectory for each class, and/or scoring the candidate trajectories to select an optimal trajectory. Topological classes are distinguished by the discrete actions taken with respect to obstacles or restricted map areas. Specifically, all possible trajectories in a topologically distinct class perform the same action with respect to obstacles or restricted map areas. Obstacles may include, for example, static objects, such as, traffic cones and bollards, or other road users, such as, pedestrians, cyclists, and cars (e.g., moving cars, parked cars, double parked cars, etc.). Restricted map areas may include, for example, crosswalks and intersections. Discrete actions may include, for example, to stop before or proceed, to track ahead or behind, to pass on the left or right of an object, and/or the like.

Motion planning 608 determines or generates planning and control data regarding the n of the autonomous vehicle that is transmitted to vehicle control system 600, such as on-board computing device 112, or routing controller 261 for execution. AV 102, for example, utilizes a motion plan to control braking via a brake controller; direction via a steering controller; speed and acceleration via a throttle controller (in a gas-powered vehicle); or a motor speed controller (such as, a current level controller in an electric vehicle); a differential gear controller (in vehicles with transmissions); and/or other controls.

In the various embodiments discussed in this document, the description may state that the vehicle or a controller included in the vehicle may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-board controller and/or vehicle control system. Examples of such other computing devices include an electronic device (such as, a smartphone) associated with a person who is riding in the vehicle, as well as, a remote server that is in electronic communication with the vehicle via a wireless network. The processor of any such device may perform the operations that will be discussed below.

FIG. 7 illustrates a diagram of an exemplary computer system 700 in which various devices, systems, and/or methods, described herein, may be implemented. Computer system 700 can be any computer capable of performing the functions described herein.

Computer system 700 includes one or more processors (also called central processing units, or CPUs), such as processor 704. Processor 704 is connected to a communication infrastructure 706 (or bus).

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, and/or the like.

Computer system 700 also includes user input/output device(s) 703, such as monitors, keyboards, pointing devices, etc., that communicate with communication infrastructure 706 through user input/output interface(s) 702.

Computer system 700 also includes a main memory (or primary memory) 708, such as random access memory (RAM). Main memory 708 may include one or more levels of cache. Main memory 708 has stored therein control logic (i.e., computer software) and/or data.

Computer system 700 may also include one or more secondary storage devices or secondary memory 710. Secondary memory 710 may include, for example, hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 reads from and/or writes to removable storage unit 718 in a well-known manner.

According to an exemplary embodiment, secondary memory 710 may include other means, instrumentalities, or other approaches for allowing computer programs and/or other instructions and/or data to be accessed by computer system 700. Such means, instrumentalities or other approaches may include, for example, removable storage unit 722 and interface 720. Examples of removable storage unit 722 and interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communications interface 724 enables computer system 700 to communicate and interact with any combination of remote devices, remote networks, remote entities, etc. (individually and collectively referenced by remote device(s), network(s), or entity(s) 728). For example, communications interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for mining streaming data, comprising:

obtaining, by one or more processors, a roadway dataset comprising a plurality of records, wherein each record in the roadway dataset includes an image logged by an autonomous vehicle (AV) in a roadway;

generating, by the one or more processors based on a text-image model, an embedding dataset comprising an image embedding for each record in the roadway dataset, each image embedding identifying a point in a high dimension space;

receiving, by the one or more processors, a query input text;

generating, by the one or more processors, a text query embedding to identify a query input point by encoding the query input text;

determining, by the one or more processors, a parametric description of a high probability field which surrounds a query input text in the high dimension space;

determining, by the one or more processors, a distance between the query input point and each image embedding of the embedding dataset;

generating, by the one or more processors, a normal distribution;

determining, by the one or more processors, at least one input image of an input stream of images that is in the high probability field;

automatically labeling, by the one or more processors, the at least one input image based on the query input text; and determining to not label a second image of the input stream of images in response to determining, by the one or more processors, that the second image of the input stream of images is not in the high probability field, wherein each input image in the input stream of images that resembles the query input text comprises a point in the high dimension space at a position within a threshold distance of a point in the high probability field representing the query input text, and wherein each input image in the input stream of images that does not resemble the query input text comprises a point in the high dimension space at a position outside the threshold distance of the point in the high probability field representing the query input text that is outside the threshold distance.

2. The method of claim 1, further comprising:

encoding an image to provide the image embedding for a corresponding image logged by the AV in the roadway dataset, wherein the image embedding represents an image embedding point in the high dimension space; and matching an embedding of each input image in the input stream of images, with the parametric description of the high probability field to determine that each input image in the input stream of images is in the high probability field, wherein the parametric description for the high probability field which surrounds the query input point associated with a query input text, and wherein it is probable based on parameters in each image embedding of the embedding dataset that each input image fitting the parametric description of the high probability field is positioned in the high probability field of the query input point.

3. The method of claim 1, wherein the input query text comprises a textual description and a probability parameter, wherein the input query text is received from a remote computing device or a remote application, wherein the input stream of images is obtained or detected by the AV, and wherein the embedding of the input image in the input stream of images is compared by the AV to the parametric description of the high probability field to determine if the image is in the high probability field.

4. The method of claim 1, wherein the high probability field comprises at least one of a spread, a top percentage of probable records, or a range representing an area of the high probability field.

5. The method of claim 1, wherein each record in the embedding dataset includes at least one image embedding and a link to a specific image which visualizes the image embedding.

6. The method of claim 1, further comprising:

slicing at least one image of the roadway dataset into a plurality of image slices; and encoding each of the plurality of image slices, wherein each of the plurality of image slices includes a metadata label.

7. The method of claim 1, wherein a content of an input image of the input stream of images is determined by comparing an embedding of the image in the input stream with at least one image embedding in the roadway dataset, without comparing pixel values.

8. A system, comprising:

a memory; and at least one processor coupled to the memory and configured to:

obtain a roadway dataset, wherein each record in the roadway dataset includes an image logged by an autonomous vehicle (AV) in a roadway;

generate, based on a text-image model, an embedding dataset comprising an image embedding for each record in the roadway dataset, each image embedding identifying a point in a high dimension space;

receive a query input text;

generate a text query embedding to identify a query input point by encoding the query input text;

determine a parametric description of a high probability field which surrounds a query input text in the high dimension space;

determine a distance between the query input point and each image embedding of the embedding dataset;

generate a normal distribution;

determine at least one input image of an input stream of images that is in the high probability field; and automatically label the at least one input image based on the query input text;

determining to not label a second image of the input stream of images in response to determining that the second image of the input stream of images is not in the high probability field, wherein each input image in the input stream of images that resembles the query input text comprises a point in the high dimension space at a position within a threshold distance of a point in the high probability field representing the query input text, and wherein each input image in the input stream of images that does not resemble the query input text comprises a point in the high dimension space at a position outside the threshold distance of the point in the high probability field representing the query input text that is outside the threshold distance.

9. The system of claim 8, wherein the at least one processor coupled to the memory is further configured to:

encode an image to provide the image embedding for a corresponding image logged by the AV in the roadway dataset, wherein the image embedding represents an image embedding point in the high dimension space; and match an embedding of each input image in the input stream of images, with the parametric description of the high probability field to determine that each input image in the input stream of images is in the high probability field, wherein the parametric description for the high probability field which surrounds the query input point associated with a query input text, and wherein it is probable based on parameters in each image embedding of the embedding dataset that each input image fitting the parametric description of the high probability field is positioned in the high probability field of the query input point.

10. The system of claim 9, wherein the input query text comprises a textual description and a probability parameter, wherein the input query text is received from a remote computing device or a remote application, wherein the input stream of images is obtained or detected by the AV, and wherein the embedding of the input image in the input stream of images is compared by the AV to the parametric description of the high probability field to determine if the image is in the high probability field.

11. The system of claim 8, wherein the high probability field comprises at least one of a spread, a top percentage of probable records, or a range representing an area of the high probability field.

12. The system of claim 8, wherein each record in the embedding dataset includes at least one image embedding and a link to a specific image which visualizes the image embedding.

13. The system of claim 8, wherein the at least one processor coupled to the memory is further configured to:

slice at least one image of the roadway dataset into a plurality of image slices; and encode each of the plurality of image slices, wherein each of the plurality of image slices includes a metadata label.

14. The system of claim 8, wherein a content of an input image of the input stream of images is determined by comparing an embedding of the image in the input stream with at least one image embedding in the roadway dataset, without comparing pixel values.

15. A non-transitory computer-readable medium having instructions stored thereon that, when executed by at least one computing device comprising one or more processors, cause the at least one computing device to:

obtain a roadway dataset, wherein each record in the roadway dataset includes an image logged by an autonomous vehicle (AV) in a roadway;

generate, based on a text-image model, an embedding dataset comprising an image embedding for each record in the roadway dataset, each image embedding identifying a point in a high dimension space;

receive a query input text;

generate a text query embedding to identify a query input point by encoding the query input text;

determine a parametric description of a high probability field which surrounds a query input text in the high dimension space;

determining a distance between the query input point and each image embedding of the embedding dataset;

generating a normal distribution;

determine at least one input image of an input stream of images that is in the high probability field;

automatically label the at least one input image based on the query input text; and determine to not label a second image of the input stream of images in response to determining that the second image of the input stream of images is not in the high probability field, wherein each input image in the input stream of images that resembles the query input text comprises a point in the high dimension space at a position within a threshold distance of a point in the high probability field representing the query input text, and wherein each input image in the input stream of images that does not resemble the query input text comprises a point in the high dimension space at a position outside the threshold distance of the point in the high probability field representing the query input text that is outside the threshold distance.

16. The non-transitory computer-readable medium of claim 15, wherein the instructions stored thereon cause the at least one computing device to:

encode an image to provide the image embedding for a corresponding image logged by the AV in the roadway dataset, wherein the image embedding represents an image embedding point in the high dimension space; and match an embedding of each input image in the input stream of images, with the parametric description of the high probability field to determine that each input image in the input stream of images is in the high probability field, wherein the parametric description for the high probability field which surrounds the query input point associated with a query input text, and wherein it is probable based on parameters in each image embedding of the embedding dataset that each input image fitting the parametric description of the high probability field is positioned in the high probability field of the query input point.

* * * * *